US007306119B2

(12) United States Patent
Wootton

(10) Patent No.: US 7,306,119 B2
(45) Date of Patent: Dec. 11, 2007

(54) DISPENSING MATERIAL PRODUCED BY A CHEMICAL REACTION

(76) Inventor: Shane Richard Wootton, The Heronry, Lakeside View, Penistone, Barnsley (GB) S36 7EX ( * ) Notice: Subject to any disclaimer, the term of this patent is extended or adjusted under 35 U.S.C. 154(b) by 417 days.

(21) Appl. No.: 10/531,175

(22) PCT Filed: Apr. 1, 2003

(86) PCT No.: PCT/GB03/01427

§ 371 (c)(1),
(2), (4) Date: Apr. 11, 2005

(87) PCT Pub. No.: WO2004/035283

PCT Pub. Date: Apr. 29, 2004

(65) Prior Publication Data

US 2006/0071018 A1    Apr. 6, 2006

(30) Foreign Application Priority Data

Oct. 18, 2002    (GB)    ................................ 0224250.1

(51) Int. Cl.
*B67D 5/60*    (2006.01)
(52) U.S. Cl. .................... 222/145.5; 222/1; 222/52; 222/94; 222/135; 222/309; 222/386
(58) Field of Classification Search ............ 222/1, 222/135–136, 145.5, 309, 145.6, 386, 94, 222/52, 63, 385, 380, 340, 518, 504–505, 222/132; 422/133–135
See application file for complete search history.

(56) References Cited

U.S. PATENT DOCUMENTS

| 3,893,621 | A |   | 7/1975  | Johnson |
| 3,975,128 | A |   | 8/1976  | Schluter |
| 4,726,933 | A | * | 2/1988  | Mayr et al. .................. 422/133 |
| 4,832,499 | A | * | 5/1989  | Fiorentini ................ 366/152.1 |
| 5,057,548 | A |   | 10/1991 | Urban et al. |
| 5,082,633 | A | * | 1/1992  | Stuper ........................ 422/133 |
| 5,127,552 | A |   | 7/1992  | Bauman et al. |
| 5,277,567 | A |   | 1/1994  | Bauer et al. |

* cited by examiner

*Primary Examiner*—Frederick C. Nicolas
(74) *Attorney, Agent, or Firm*—James Creighton Wray; Clifford D. Hyra

(57) ABSTRACT

Apparatus (104) for dispensing material produced by a chemical reaction between a first chemical reagent and a second chemical reagent. The apparatus comprises injection means (306) configured to produce a jet of the first chemical reagent and a jet of the second chemical reagent such that the jets collide to produce the material. The apparatus further comprises a storage chamber (317) and a closing device (321). The storage chamber is arranged to provide temporary storage space for the material, and it has an inlet for receiving said material and an outlet (319) for dispensing the material. The closing device is moveable between a first position in which the material is prevented from passing through the outlet of the storage chamber, while allowing material to be received into the storage chamber through the inlet, and a second position in which the material is allowed to be dispensed through said outlet.

35 Claims, 17 Drawing Sheets

DISPENSING MATERIAL PRODUCED BY A CHEMICAL REACTION

This application claims the benefit of Great Britain Application No. 0224250.1 filed Oct. 18, 2002 and PCT/GB2003/001427 filed Apr. 1, 2003, which are hereby incorporated by reference in their entirety.

BACKGROUND OF THE INVENTION

1. Field of the Invention

The present invention relates to apparatus for dispensing material produced by a chemical reaction between a first chemical re-agent and a second chemical re-agent. The dispensed material may be foam-like or elastomeric. Preferably, the material is in a fluid state allowing it to be cast and then cured into a substantially solid construction.

2. Description of the Related Art

Foam-like material such as polyurethane is produced in situ so that it expands and sets into required shapes. A first chemical re-agent may be a diol and a second chemical re-agent may be a diisocyanate. In addition, small amounts of water are added to the reaction mixture during the polymerisation process to produce carbon dioxide gas that acts as the foaming agent.

High pressure systems are known in which the chemical re-agents are brought into contact under high velocity having been released from respective high pressure nozzles. High pressure systems of this type produce good quality polyurethane foam and require minimal maintenance. However, a problem with these systems is that output rates tend to be relatively high and attempts to scale down output production by reducing the size of the apparatus, and thereby reducing the volume of material released from the respective nozzles, have introduced further engineering difficulties.

Low pressure systems are known that use mechanical mixing operations and are thereby capable of operating at lower output rates/volumes. However, low pressure systems introduce further problems in that the quality of the mix tends to be lower than that produced by high pressure systems and organic solvents are required on a regular basis to effect the cleaning of a mixing chamber. In both of these known systems the rate of foam production is controlled by controlling the flow of the individual re-agents.

A further problem may be encountered with existing high pressure systems where injection into a mould is required. If the mould resists flow of material from the mixing head, a consequential build-up of fluid pressures within the system can prove catastrophic to production.

BRIEF SUMMARY OF THE INVENTION

According to an aspect of the present invention, there is provided apparatus for dispensing material produced by a chemical reaction between a first chemical reagent and a second chemical reagent, comprising: injection means configured to produce a jet of said first chemical reagent and a jet of said second chemical reagent such that said jets collide to produce said material; a storage chamber arranged to provide temporary storage space for the material, said storage chamber having an inlet for receiving said material, and an outlet for dispensing the material; and a closing device moveable between a first position in which the material is prevented from passing through said outlet and a second position in which the material is allowed to be dispensed through said outlet.

By providing for the temporary holding of reacting material, it is possible for the material to be produced at a first high rate thereby making use of preferred high pressure techniques. Therefore the foam-like material may be dispensed at much lower rates, consistent with low pressure systems while taking advantage of the improved mixing qualities of the high pressure system and without requiring environmentally unfriendly organic solvents for cleaning purposes.

Alternatively, the temporary storing of reacting material after production has finished, allows the stored material to be subjected to high pressures required for injection into moulds.

WRITTEN DESCRIPTION OF THE BEST MODE FOR CARRYING OUT THE INVENTION

FIG. 1

Figure 1:
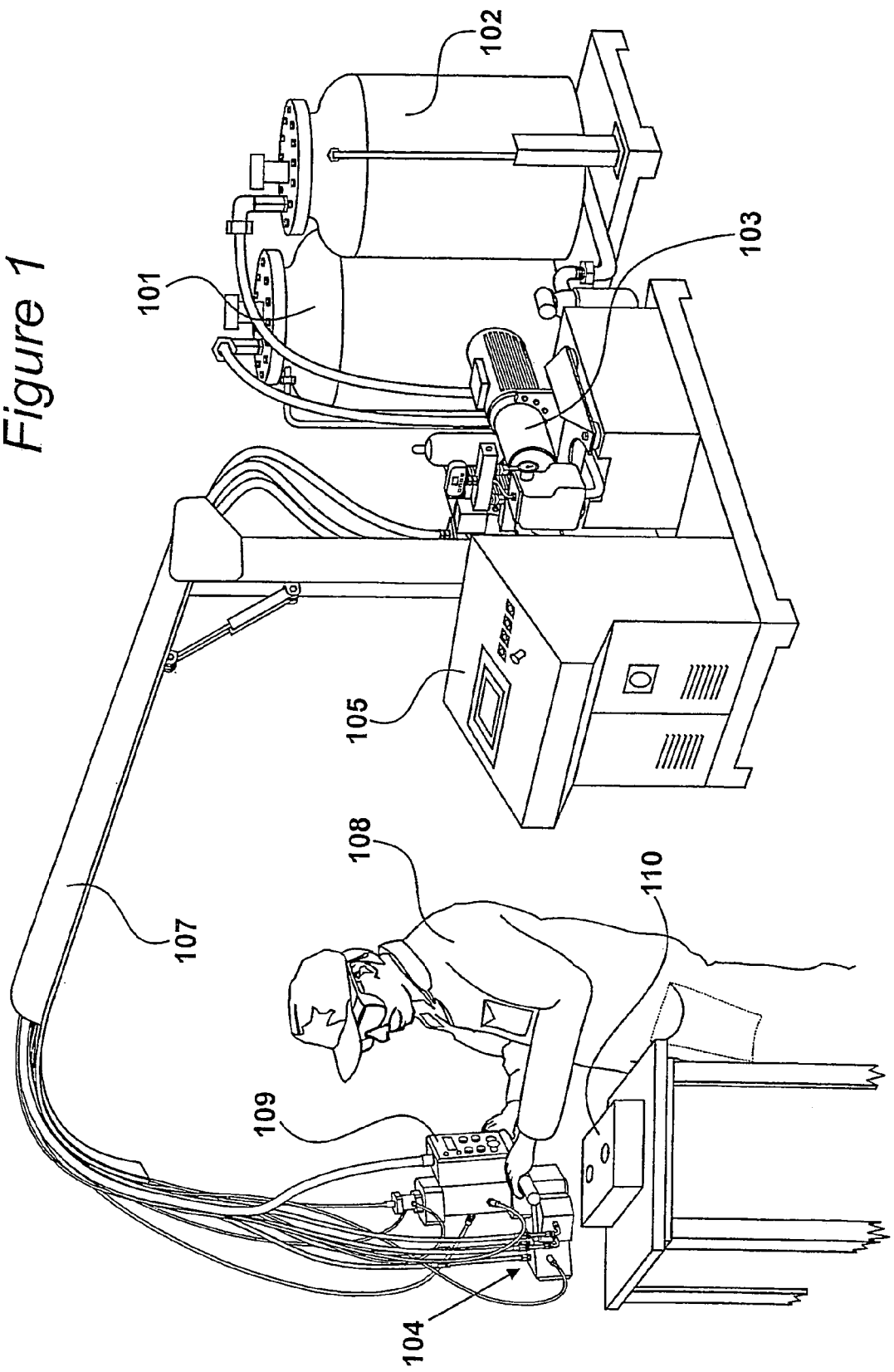
FIG. 1 shows a facility for the production of polyurethane items such as air filters.

Apparatus used for the production of a material by high pressure mixing of chemical reagents is shown in FIG. 1. For the purpose of providing an illustration, the apparatus of FIG. 1 is used for the production of polyurethane items such as air filter cartridges for vehicles. Polyurethanes, and similar materials, have many applications in situations where flexible light-weight materials are required.

The apparatus comprises a first storage container 101 containing a first stored chemical component, and a second storage container 102 in which a second chemical component is stored. Pumping devices 103 provide for circulation of the chemical components to a dispensing head 104 at high pressure. Reacted polyurethane foam is dispensed from the head 104 and the overall operation of the device is controlled by a computer system 105. The dispensing head 104 is suspended from a boom 107, which also supports electrical cabling, hydraulic pipes, and pipes carrying the two chemical components to the dispensing head 104. A control unit 109 mounted on the dispensing head 104, is provided to allow a human operator, such as operator 108, to input commands to the computer system 105.

In the present example, the dispensing head is manoeuvred by the operator 108 into position to inject the dispensed polyurethane into each of the moulds 110. Each mould in this example requires a relatively small amount of polyurethane, i.e. twenty-five grams, and conventionally, due to the difficulties in producing such small quantities with high pressure systems, the tendency would have been to use a low pressure system with the disadvantages previously discussed. However, the apparatus of FIG. 1 allows relatively small quantities of polyurethane to be dispensed, at relatively low rates, while at the same time allowing materials to be reacted at high pressure, thereby improving quality and removing the need for cleaning procedures using organic solvents.

When manufacturing other items which require even smaller quantities of polyurethane, e.g. five grams, the manoeuvring of the dispensing head is preferably performed by a robotic arm or other electromechanical manipulator. This is because the repositioning must be performed within time limits determined from the rates at which the chemicals react to form the polyurethane.

In addition to electromechanical manipulation of the dispensing head, moulds may be automatically moved into position below the dispensing head.

In the present example, only relatively low pressures are required to inject the dispensed material into the moulds. However, when moulds are used which have a small runner system, and consequently high pressure injection into the mould is required, the dispensing head may be clamped to the mould to avoid the foam pressure pushing the head out of position.

FIG. 2

Figure 2:
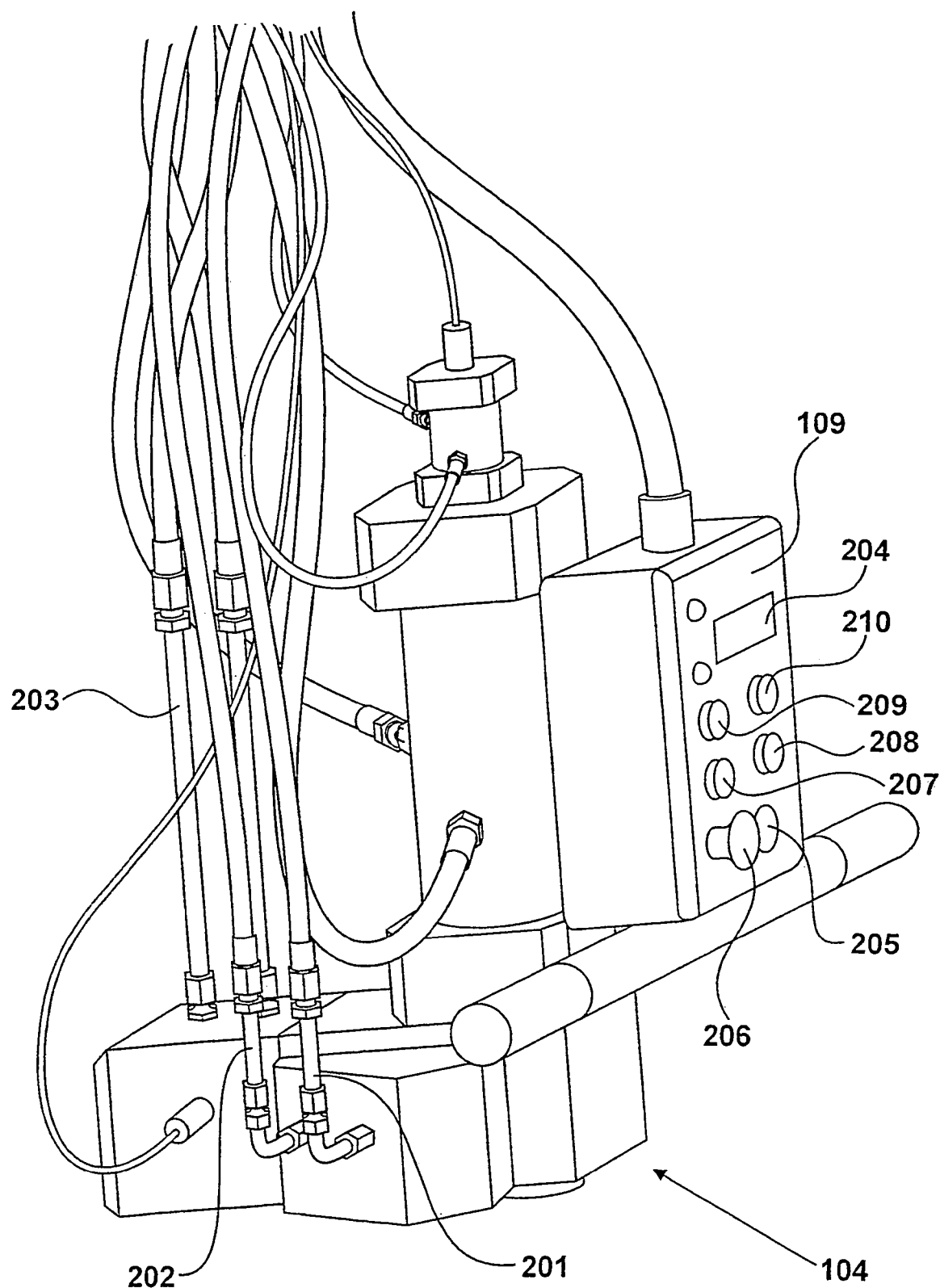
FIG. 2 illustrates a dispensing head for dispensing material.

The dispensing head 104 for dispensing material, and the associated control unit 109 are illustrated in FIG. 2. The dispensing head receives the first chemical reagents via pipe 201, and a second pipe 202 allows it to be returned to the first storage container 101. Similar pipes are provided for the supply of the second reagent to the other side of the dispensing head.

The head 104 is also supplied with pipes carrying hydraulic fluid, such as pipe 203. Hydraulic pressure is used to energise the moving components of the dispensing head 104, and the purpose of the hydraulic fluid will be described in detail below.

The control unit 109 has a display unit 204, in the form of a liquid crystal display, which is used to present information to a user such as human operator 108. The control unit 109 also has several button switches 205, 206, 207, 208, 209, and 210. Buttons 210 and 209 allow an operator to scroll up and down through pre-programmed cycles stored within computer system 105, and displayed on display unit 204. Each cycle is defined by the weight of material produced in each production event, the ratio of the two chemical reagents used to produce material, the weight of material dispensed in each dispensing event, and the number of dispensing events. (The ratio of the reagents is adjusted to provide a required change in the properties of the generated material. The ratio is typically adjusted by less than plus or minus ten percent, by adjusting the ratio of the reagent injection pressures within allowed tolerances). In addition, for certain quantities of dispensed material, the cycle is also defined in respect of dispensing pressure and/or dispensing rate.

After selection of a particular cycle using buttons 209 and 210, cycle start button 208 is pressed to start a production/dispensing cycle. If the operator 108 needs to stop production, the cycle stop button 207 is depressed, or if the apparatus must be shut down in an emergency, emergency stop button 206 is depressed.

When the dispensing head is used manually, as shown in FIG. 1, the operator 108 depresses a manual dispense button 205 to indicate to the computer system 105 that the next dispensing event of the cycle should be performed. In cases where manoeuvring of the dispensing head 104 is automated, the head 104 receives a "dispense signal" from the electromechanical manipulator when correct positioning has been achieved.

FIG. 3

Figure 3:
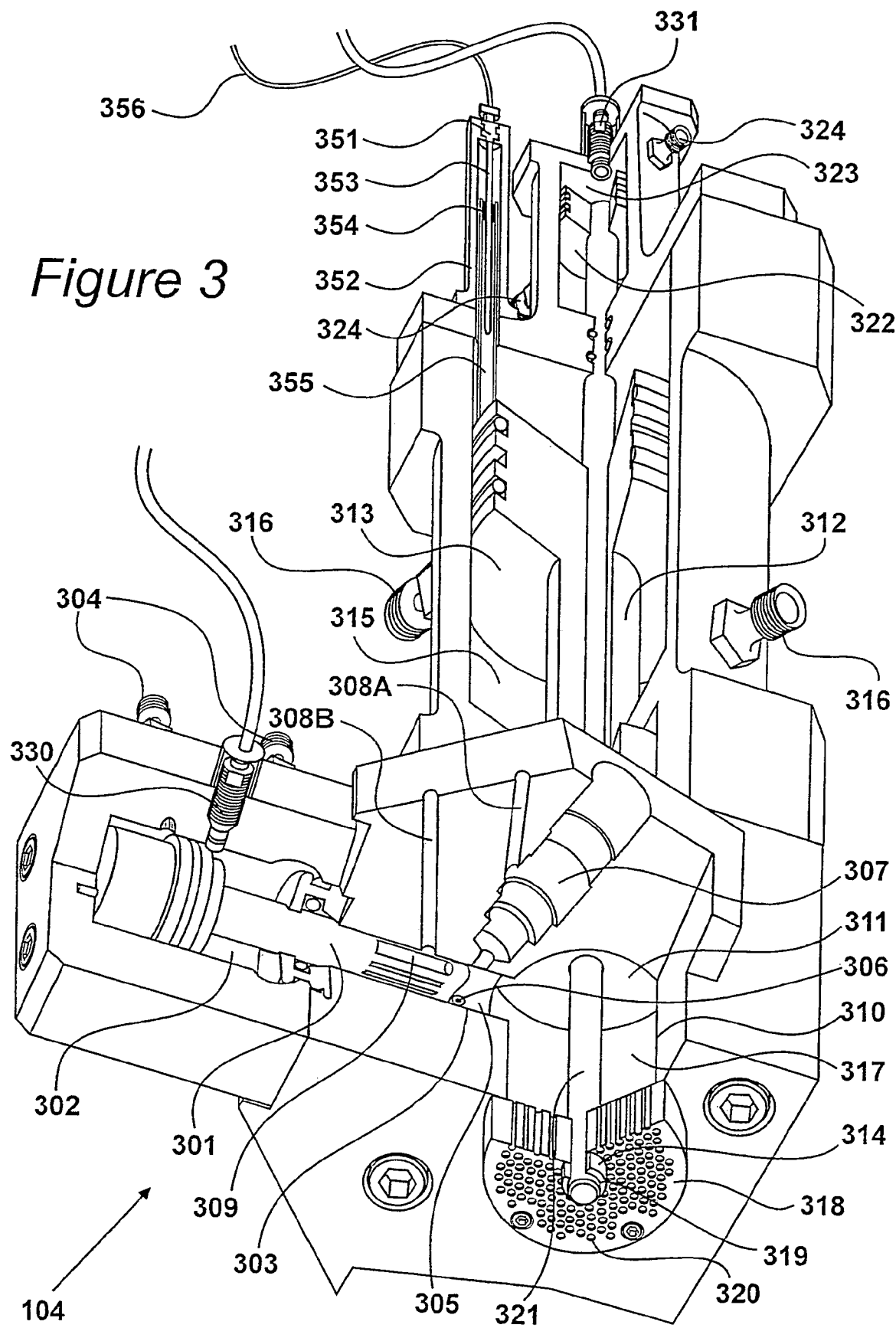
FIG. 3 shows a cut-away view of the dispensing head 104, providing details of its internal structure.

A cut-away view of the dispensing head 104, providing details of its internal structure, is shown in FIG. 3. The dispensing head 104 has a production piston 301, which has a rear end located within a hydraulic cylinder 302 and a front end located within a material production cylinder 303. The piston 301 is moved between its fully forward and fully retracted position at high speeds by means of hydraulic pressure applied via hydraulic fluid connectors 304.

In the retracted position, illustrated in FIG. 3, the front face of the piston 301 and the wall of the production cylinder 303 define a production chamber 305 with a volume of approximately one cubic centimetre. During production, the first and second chemical reagents are injected at high pressure into the production chamber 305 via a respective one of two jets. The nozzle 306 of one of the jets is shown in FIG. 3, while the location of the second jet is indicated at 307. The jets are arranged so that each of the chemical reagents enters the production chamber as a jet of liquid and violently collides with the other jet of liquid at high velocity. This provides efficient mixing of the two reagents and the resulting chemical reaction produces dispensable material (for example polyurethane foam). This type of high pressure mixing/production is known in the art.

Inlet duct 308A allows chemical reagent to be supplied to the jet located at 307, while outlet duct 308B allows the same unreacted reagent to be removed from the mixing head 104. (Similar inlet and outlet ducts are provided for the other jet.) A pair of closed ended slots 309 are provided in the piston 301 so that when the piston 301 is in its forward position, the chemical reagents may be circulated at high pressure through the inlet ducts, such as 308A, through their respective jets, through a respective slot 309, and out through an outlet duct, such as 308B. By this means, the reagents may be circulated through the jets at high pressure prior to mixing to allow the mixing pressure to be established and stabilised. The production piston 301 is then retracted at high speed, and the high pressure jets of reagent collide. When a required weight of material has been produced, the piston 301 is moved forwards at high speed to stop production, and the chemical reagents are again allowed to circulate through slots 309. Thus, the high pressure jets are switched on and off very quickly without unacceptable pressure build up in chemical reagent supply circuits.

The production chamber has one end open to a dispensing cylinder 310 which contains the lower end 311 of a dispensing piston 312. The upper end 313 of the piston 312 is located in a second hydraulic cylinder 315 so that the piston 312 may be pushed downwards or upwards by applying the necessary fluid pressure via hydraulic connectors 316.

In retracted positions, as shown in FIG. 3, the front face of the piston 312 and the wall of the dispensing cylinder 310 define a dispensing chamber 317. A cap 318 provides a lower wall to the chamber 317 at its lower end. At its centre; the cap 318 has a nozzle 314 defining a circular aperture which provides an output port 319 through which material in chamber 317 is dispensed. During operation material generated in the production chamber 305 passes through its open end into the dispensing chamber 317. Thus the open end of the production chamber 305 defines an inlet for the dispensing chamber 317.

In the preferred embodiment, the tolerance between the dispensing piston 312 and the inside wall of the dispensing chamber 317 is between ten microns and fifteen microns. Preferably, the diameter of the lower end 311 of the dispensing piston 312 will be between forty and seventy millimetres providing a dispensing force of approximately 11 tonnes.

An array of smaller ducts 320 are provided through the cap 318, such that each duct 320 provides a passage from the chamber 317 to an outer surface of the cap. Over time, there is a tendency for fully reacted material to build up on the inner surface of the cap 318. This unwanted material is periodically removed by extruding it through the ducts 320 under pressure of the dispensing piston 312. This purging operation will be described below in further detail with reference to FIG. 13. However, during general use, it is arranged for the ducts 320 to be full of solid reacted material which provides a plug to prevent leakage of un-reacted material.

The ducts 320 are preferably tapered such that they have a larger diameter at the inner surface and a smaller diameter at the outside surface of the cap. This shape provides assistance when the extruding operation is performed.

Furthermore, the inner surface of the cap 318 is shaped such that it has raised portions, each providing a cutting edge, located between the ducts 320, and angled surfaces which slope down towards the ducts 320. In the present embodiment this is achieved by providing the ducts with intersecting countersinks. During the extrusion process, the cutting edges provide assistance by cutting into the solidified material on the inner surface of the cap, the material is then forced into the countersinks whose angled surfaces funnel said material into the ducts 320.

In an alternative embodiment, the inner surface of the cap 318 is provided with an array of V-shaped grooves which meet at their upper edges to provide cutting edges. The ducts 320 are spaced along the bottom of the grooves so that during the extrusion process the solid material tends to be cut by the cutting edges formed by the grooves, and funnelled by the sloping surfaces of the grooves towards the ducts. The grooves preferably extend radially outward from the output port 319, deepening as they extend outward so that the cutting edges extend along their whole length.

In an alternative embodiment, the dispensing head 104 is provided with cooling means for cooling the cap 318. Consequently, the rate of reaction of material within chamber 317 adjacent to the cap is retarded and the frequency of performing the purging cycle is reduced. Such cooling may be provided by circulating cooled liquid through additional pipes arranged in or adjacent to the cap 318.

In an alternative embodiment, a disc having an array of apertures matching that of the cap 318 is rotatably mounted to the outer surface of said cap. Thus, the disc may be rotated to a first position in which the apertures of the disc and cap are aligned to allow the extruding operation to take place. Or, the disc may be rotated to a position in which the ducts 320 of the cap 318 are blanked off by the disc to prevent material escaping through said apertures during normal dispensing operations.

The dispensing piston 312 has a circular bore extending along its axis and an output control rod 321 is located within said bore. The upper end of the rod 321 is attached to a piston 322 located within a third hydraulic cylinder 323, and, thus, by applying hydraulic pressure to the piston 322 via hydraulic connectors 324, the rod 321 may be moved between a forward and a retracted position. In the retracted position, the lower end of rod 321 is located within the dispensing chamber 317, and material located within said chamber may be dispensed through output port 319. When the rod 321 is in its forward position, its lower end is located within the output port 319 and it has a sufficiently good fit within said port to prevent material within the chamber 317 from escaping. The output control rod 321 therefore provides a means of closing the output port 319. However, in addition, it provides a means of clearing the output port of material.

Preferably, the output control rod 321 will have a diameter of eight to fifteen millimetres and the total area of contact between all moving surfaces will be sufficient to provide effective sealing but will not be so great as to create sticking problems.

During one mode of operation of the dispensing head 104, material produced in chamber 305 is temporarily stored in dispensing chamber 317, and accurate quantities of material are then dispensed by moving the dispensing piston forward by a controlled amount. For this reason, a signal relating to the position of the dispensing piston is generated and sent to the computer system 105 by a position sensor 351.

The sensor 351 is a linear conductive plastic position transducer located in a housing 352 which extends from the upper end of the second hydraulic cylinder 315. The sensor 351 has a conductive plastic portion 353 rigidly fixed to the upper end of the housing 352, and a wiper 354 rigidly fixed to the upper end of a guide tube 355. The guide tube is itself rigidly attached to the upper end 313 of the piston 312, and thus, as the piston 312 moves up or down, the wiper 354 is moved in a corresponding manner along the conductive plastic portion 353. An electrical reference voltage is supplied to the sensor 351 and a voltage signal indicative of the wiper's position is received from the sensor by means of electrical cable 356.

The guide tube 355 is dimensioned to slide up and down within housing 352 while limiting rotational movement of the piston 312, and thus the sensor 351 is protected from potentially damaging bending forces. In the present embodiment the sensor 351 is a conductive plastic incylinder transducer with a stroke length of 150 mm, manufactured by Variohm-Eurosensor Ltd. in the UK under reference number P6403-100-H003.

In use, the pistons 301 and 322 are required to be fully forward or fully retracted. In order to provide data to the computer system 105 informing of their status, the relevant cylinders are provided with proximity switches 330 and 331 respectively.

The apparatus includes a hydraulic power pack (not shown) capable of charging an accumulator to a pressure of two hundred bar for normal operation of the three hydraulic pistons within the mixing head. In addition, a hydraulic intensifier (not shown) is used to charge a second accumulator to a pressure of four hundred bar, for use when a purging operation is required to extrude unwanted solid material from the dispensing chamber.

Both the output control rod and the production piston are operated by a respective two-way hydraulic directional control valves. In the present embodiment the hydraulic control valves are manufactured by Atos with reference number DHI-0631/2-00. A requirement of the dispensing piston is that it may be moved forwards at controlled rates and/or under controlled pressure, and consequently, a proportioning valve controls its movement. In the present embodiment, the proportioning valve control is a proportional valve (cetop3) series DLHZO, driven by electronic driver series E-ME-T-2H under the control of a closed loop controller series E-ME-K-PID, all manufactured by Atos.

In the present embodiment, the upper part 313 of the dispensing piston 312 has a diameter of 85 mm, while the lower part 311 has a diameter of 50 mm, and the output control rod has a diameter of 10 mm. Thus, the surface area of the upper part 313 on which hydraulic fluid acts to force piston 312 down is more than twice the surface area of the lower part 311 which acts upon material in dispensing chamber 317. As a result, the pressure applied to the material to dispense it, is more than twice the applied hydraulic pressure. For example, two hundred bar hydraulic pressure generates a pressure of approximately five hundred and seventy bar in the material being dispensed. This pressure increase can be used to advantage where high pressure injection into a mould is required.

In an alternative embodiment, colour is injected down the centre of the production chamber 301 so as to provide efficient mixing of colour pigments prior to the material being received within the output dispensing chamber 317.

It is also possible to fit two (or more) production chambers to a single dispensing chamber thereby allowing two types of material to be dispensed from the same head in an alternating manner. Under these conditions, it is possible to recharge the dispensing chamber alternately from different production chambers such that the same head may dispense soft or hard material on alternate cycles, or different coloured material on alternate cycles. For instance, each production chamber may be supplied with a different polyol stream and a common isocyanate, such that the dispensing chamber may be charged with, and dispense, different types of material in an alternating manner. Alternatively, one or more of the production chambers may be arranged to mix a colour pigment with the reagents, whereby the dispensing chamber may be charged with, and dispense, material of different colours in an alternating manner.

FIG. 4

Figure 4:
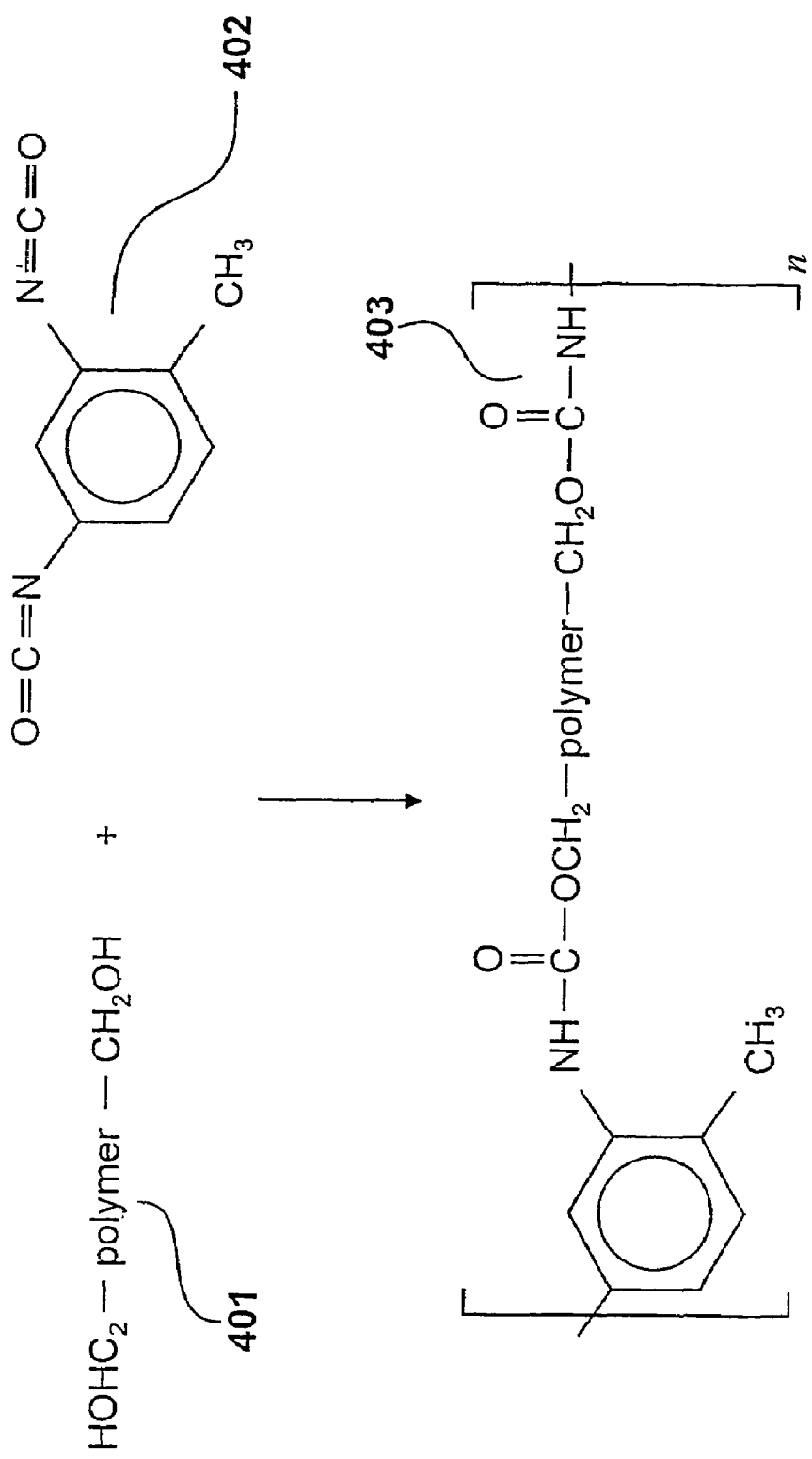
FIG. 4 shows an example of a chemical reaction for producing foam-like polyurethane.

By way of example, a chemical reaction to generate material within dispensing head 104 is illustrated in FIG. 4. In this case, the first and second chemical components are a diol 401 and a diisocyanate 402 which react to produce polyurethane 403. Preferably, large diisocyanate molecules are employed as these are less hazardous.

FIG. 5

Figure 5:
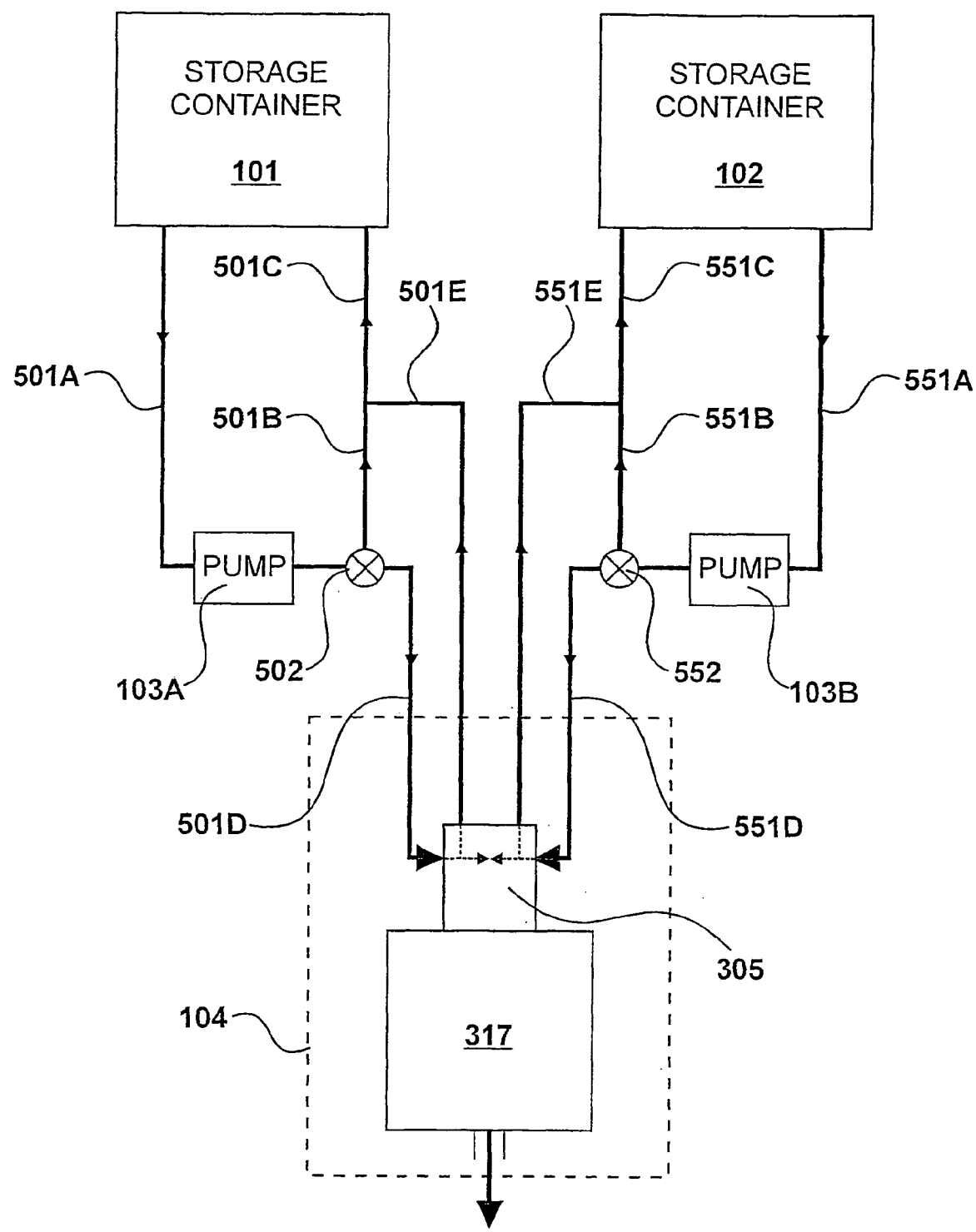
FIG. 5 shows a schematic diagram illustrating the flow of chemical reagents within the apparatus of FIG. 1.

A schematic diagram illustrating the flow of chemical reagents within the apparatus of FIG. 1, is shown in FIG. 5.

When the apparatus is not producing material, chemical reagents stored in storage containers 101 and 102 are circulated around a circuit at low pressure. Thus, the first chemical reagent stored in storage container 101 is circulated by a first pumping device 103A through pipe 501A, through a first stream distributor valve 502, and back to the container 101 through pipe sections 501B and 501C. Similarly, the second chemical reagent stored in storage container 102 is circulated by a second pumping device 103B through pipe 551A, through a first stream distributor valve 552, and back through pipe sections 551B and 551C.

Immediately prior to material production, the stream distributor valves are closed to prevent flow through pipe sections 501B and 551B. Consequently, the first chemical reagent is circulated through pipe sections 501A and 501D to the mixing head 104, and when the production piston 301 is in its forward position, said reagent is returned via pipe sections 501E and 501C to the container 101. Similarly, the second chemical reagent is circulated through pipe sections 551A, 501D and returned via pipe sections 551E and 551C. Thus, the chemical reagents are circulated through the jets within the mixing head and the required high pressures for mixing are established and stabilised.

When mixing begins, the production piston 301 is retracted and the first and second chemical reagents are mixed within production chamber 305 to generate new material, such as polyurethane foam. The newly generated material passes from the production chamber 305 into the dispensing chamber 317, from which it is either dispensed immediately, in a first mode of operation, or after a short period of storage in a second mode of operation.

FIGS. 6A to 6E

The first mode of operation, of the mixing head 104 is shown schematically in FIG. 6A to 6E.

Figure 6A:
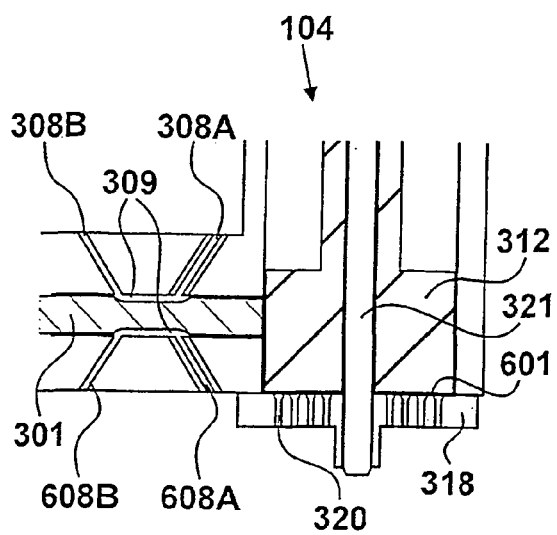
FIGS. 6A to 6E illustrate the first mode of operation of the mixing head 104.

The mixing head 104 is shown in FIG. 6A in its post-production configuration, and thus it is in a position to begin a new production cycle. Therefore, the production piston 301, the dispensing piston 312 and the output control rod 321 are all in their fully forward positions. The mixing head has been used, or has been prepared for use in a manner to be described below. Consequently, a layer 601 of solid fully reacted material exists between the dispensing piston 312 and the inner surface of the cap 318, and which extends through the ducts 320.

Within a predefined period prior to production of material, the chemical regents are circulated through inlets 308A and 608A through the respective jets and slots 309 in the production piston 301, and out through outlets 308B and 608B.

Figure 6B:
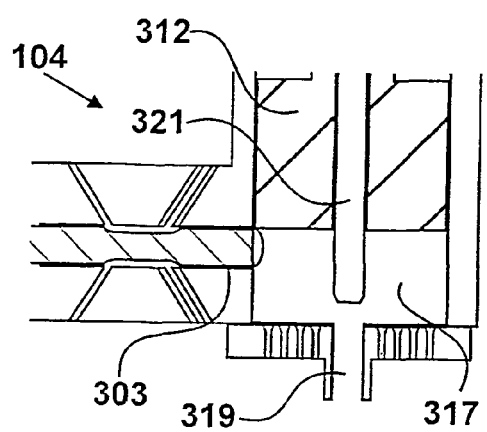

The configuration of the mixing head immediately prior to production in the first mode is shown in FIG. 6B. The dispensing piston 312 has been retracted to a pre-defined position to define the dispensing chamber 317, and such that its lower end just clears the end of the production cylinder 303. The output control rod 321 is retracted such that the output port 319 is open.

Figure 6C:
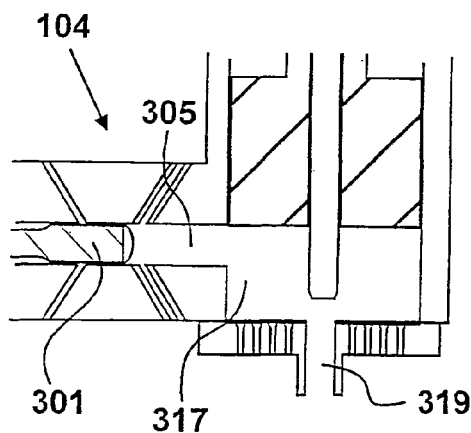

Production then takes place by the retraction of the production piston 301 as illustrated in FIG. 6C. In this configuration, mixing and reaction of the chemical reagents takes place within production chamber 305. Due to the high pressures and energies involved in the process, the newly produced material passes from the production chamber 305, through dispensing chamber 317 and out through output port. Thus, in this mode, the mixing head produces and dispenses material simultaneously, in a similar manner to a conventional mixing head. However, in contrast to a conventional mixing head, the mixing head 104 has an output control rod 321 which is in line with the axis of the production chamber 305. Consequently, the material expelled from production chamber 305 tends to strike the output control rod 321, and this enhances mixing of the chemical reagents, particularly at the very start of production, when the two jets of chemical reagents first collide.

Figure 6D:
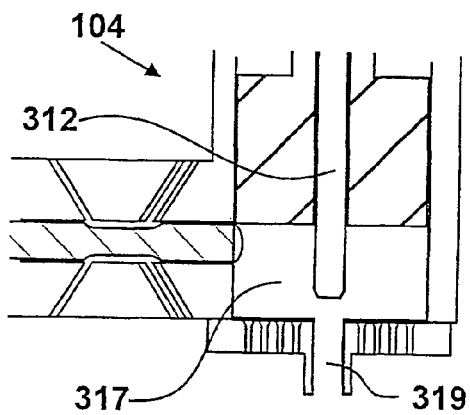

When material has been produced for the required time, and thus the required quantity of material has been produced, the production piston is moved to its forward position to end production. This situation is illustrated in FIG. 6D, in which production of material has ended, but some material still occupies the dispensing chamber 317. The dispensing piston 312 is immediately moved forwards to dispense the remaining material through the output port 319.

Figure 6E:
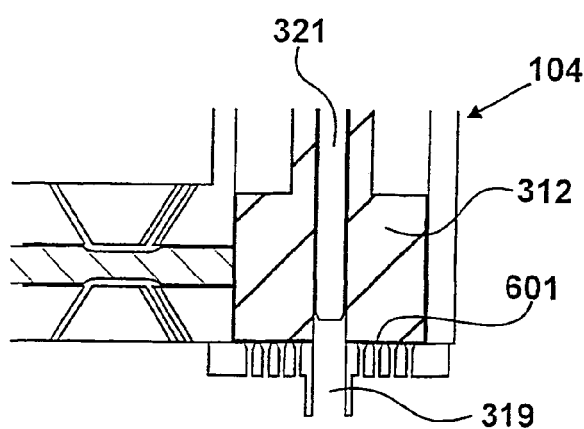

FIG. 6E shows the status of the mixing head after the dispensing piston 312 has been moved fully forward. Under the very high pressure which may be exerted by the dispensing piston, only a very small quantity of liquid material remains trapped between the dispensing piston 312 and the upper surface of the solid material layer 601. A small quantity of liquid material is inevitably trapped, but, after fully reacting, this merely adds to the thickness of the solid material layer 601.

Immediately after moving the dispensing piston to its fully forward position, the output control rod 321 is also moved to its fully forward position to eject the remaining material from the dispensing chamber output port 319. After this movement, the mixing head is once again in its post-production configuration illustrated in FIG. 6A.

FIGS. 7A to 7F

A second mode of operation of the mixing head 104 is illustrated by FIGS. 7A to 7F.

Figure 7A:
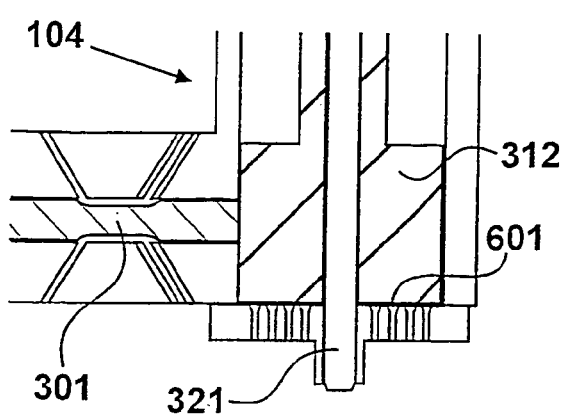
FIGS. 7A to 7F illustrate a second mode of operation of the mixing head 104.

The mixing head 104 is shown in FIG. 7A in its post-production configuration. Thus, FIG. 7A is merely a copy of FIG. 6A, provided to facilitate illustration of the second mode. Since the mixing head is between production cycles, the production piston 301, the dispensing piston 312 and the output control rod 321 are each in their fully forward positions.

In the second mode of operation, material is produced and stored in the dispensing chamber and then, immediately after production has finished, the stored material is dispensed. Therefore, before production of material begins, the dispensing piston is retracted to provide the dispensing chamber 317 in which material is temporarily stored. The amount of backward movement of the dispensing piston 312 from the upper surface of the solid layer 601 is calculated to provide a suitable sized space for the material being produced.

It should be noted that the fully forward position of the dispensing piston, as shown in FIG. 7A, varies with use, because the solid material layer 601 increases in thickness during each dispensing cycle. However, the position sensors on the dispensing piston provide information to the computer system 105 of its fully forward position, and thus its backward movement is calculated from this.

Figure 7B:
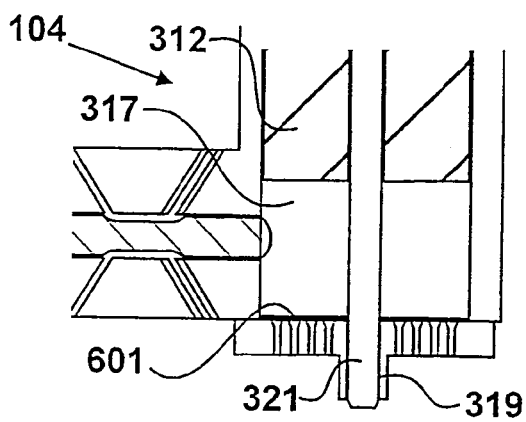

The mixing head 104 is shown in FIG. 7B after the dispensing piston 312 has been retracted by the calculated distance from the upper surface of the solid layer 601. The output control rod 321 is still located within the output port 319 and consequently, the backward movement of the dispensing piston 312 has left a vacuum within dispensing chamber 317.

Figure 7C:
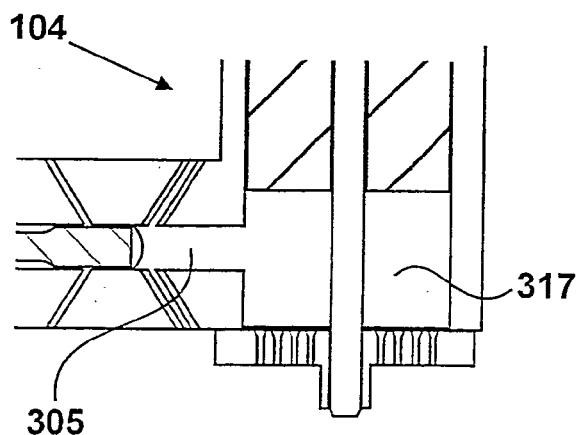

Having established an evacuated dispensing chamber, the production piston is retracted to start production of material. The configuration of the mixing head 104 during material production is shown in FIG. 7C. The material produced in production chamber 305 tends to be forced into the dispensing chamber by the high energy of the material, and this movement is assisted by the vacuum within the chambers 305 and 317.

Figure 7D:
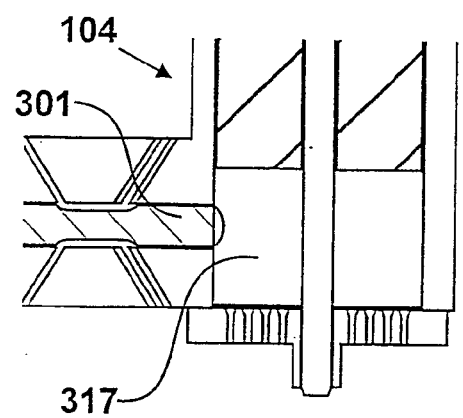

When production has taken place for the required period to generate the required weight of material, the piston 301 is moved forward to end production, as shown in FIG. 7D. As in conventional mixing heads, the production piston 301 also clears the production chamber of remaining material.

However, unlike in a conventional mixing head, the newly generated material is temporarily stored. It has been found that for materials such as polyurethane, which are conventionally produced and dispensed simultaneously, a finite time period exists in which the material may be stored and dispensed. This period of time is typically less than twenty seconds, but it is utilised by the present invention to enable greater versatility in the manner in which the material is dispensed.

Figure 7E:
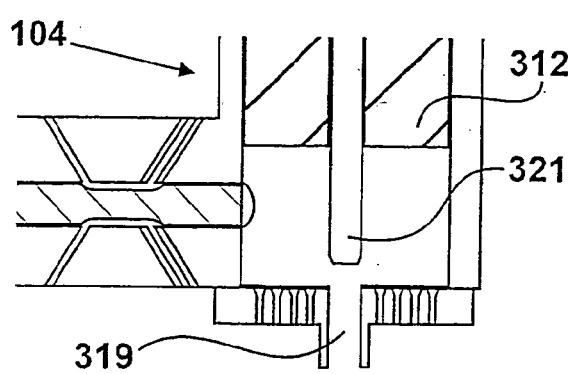

To allow dispensing to take place, the control rod 321 is withdrawn to open the output port 319, as shown in FIG. 7E. The material is then dispensed by moving the dispensing piston 312 forward. The dispensing piston may be moved at a controlled rate, under controlled pressure, and by a controlled distance. Thus, for example, where the mixing head is used to supply polyurethane to a mould with a very small runner, the very high pressures which may be applied by the dispensing piston 312 ensure that the material flows as required. Alternatively, for example, if the mixing head is used to fill several small moulds with only a small quantity of polyurethane, the dispensing piston is moved forward by a calculated distance to dispense said small quantity to a first mould, the mixing head is moved to a second mould and then a second small quantity is dispensed to the second mould, and so on. It should be noted that while the mixing head is moved between moulds, the output port 319 is temporarily closed by control rod 321 to prevent leakage of material from the dispensing chamber 317.

In a case such as this, because the production of material has been separated from the dispensing operation, the rate at which material is dispensed may be different from the rate of production, the pressure of dispensing may be varied without adversely affecting production, and the individual quantities that are dispensed to each mould may be a fraction of the material produced.

Figure 7F:
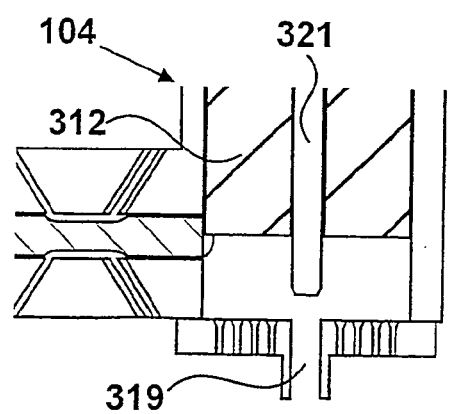

FIG. 7F shows the mixing head after the dispensing piston 312 has been moved forward by a calculated amount to dispense a small quantity of material to a small mould. Similar movements of the dispensing piston are subsequently made to dispense similar quantities to a number of further moulds, and to bring the dispensing piston to the fully forward position. The output control rod 321 is then brought forward to close and clear the output port 319, and the mixing head is, once again, placed in the configuration shown in FIG. 7A.

FIG. 8

Operations performed by the computer control system 105 (or similar control system, such as a programmable logic controller, or a micro-controller) in order to control the production and dispensing of material are illustrated by the flow charts shown in FIGS. 8 to 15.

Figure 8:
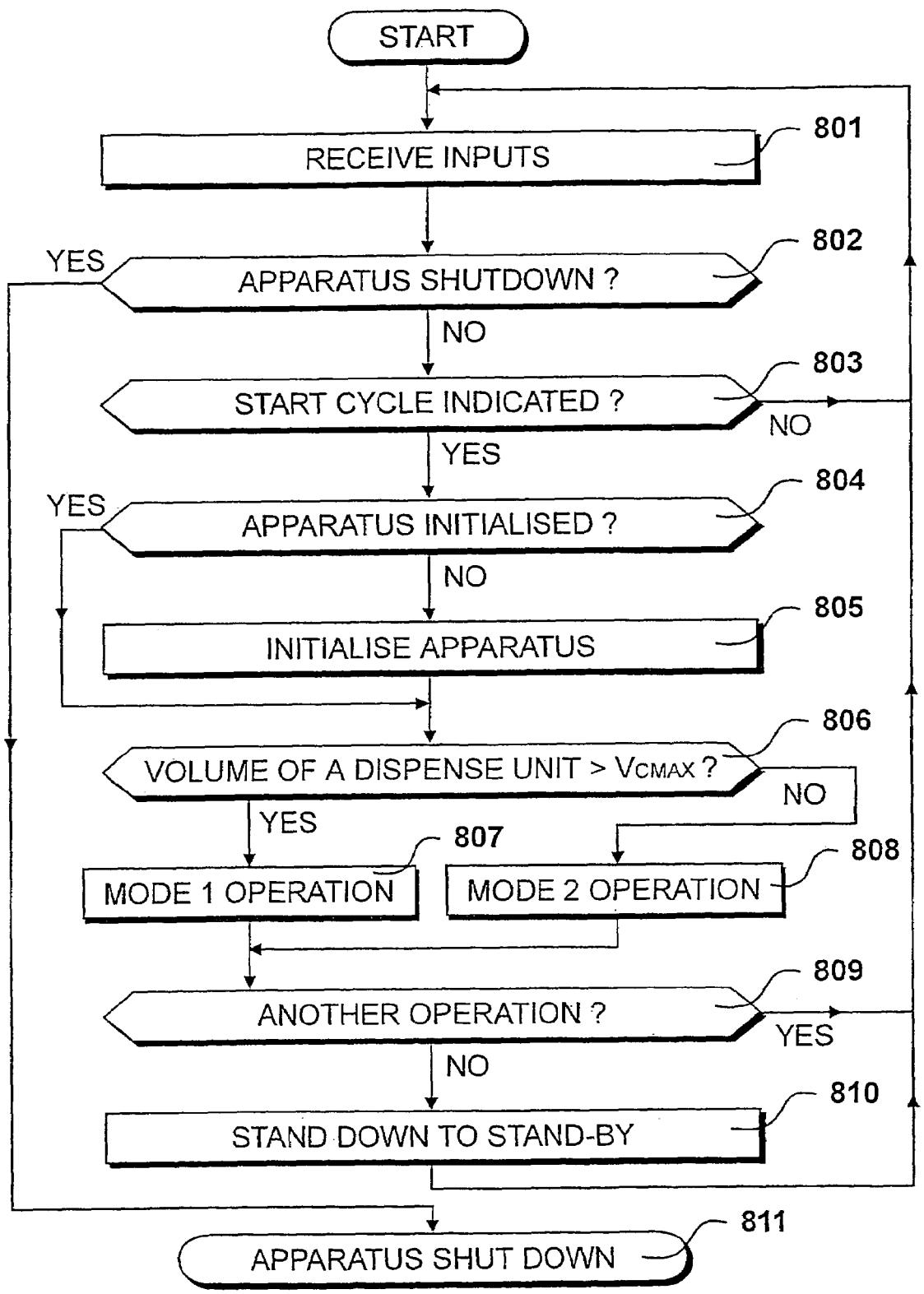
FIG. 8 shows a flow chart providing an overview of the operation of the computer control system 105 for controlling the production and dispensing of material.

An overview of the operation of the control system 105 is shown in FIG. 8. Step 801 represents a set-up procedure in which the apparatus receives inputs defining a production and dispensing operation, or possibly an indication to shut down. The inputs may be user inputs made at control unit 109 or computer system 105 directly, or alternatively may be received from some other external controlling apparatus such as a computer. The inputs may define a new operation in terms of the weight of each dispensed unit, the total number of units to be dispensed, the rate of dispensing, and the pressure under which the material is dispensed. In some applications the ratio of reagents may also be adjusted. For example, when producing polyurethane, the mix of diol and diisocyanate may be adjusted as the application requires. Thus, the ratio of reagents is also specified when defining a new dispensing operation. Alternatively, the inputs may merely select an pre-defined production cycle using control unit 109, and indicate its start.

After receiving inputs at step 801, a question is asked at step 802 to determine if apparatus shut down has been indicated, and, if it has, then the apparatus is shut down at step 811. Otherwise, step 803 is entered where it is determined whether a dispensing cycle start has been indicated. If not then the process returns to step 801 and steps 801 to 803 are looped around until either of the questions at steps 802 or 803 is answered yes.

If the question at step 803 is answered yes then a question is asked at step 804 as to whether the apparatus has been initialised. If it has, then step 806 is entered directly but otherwise the apparatus is initialised at step 805 before step 806 is performed.

At step 806 it is determined whether or not the volume of each unit of material to be dispensed is greater than the maximum volume of the dispensing chamber 317, and if it is, then material is produced and dispensed in the first mode of operation illustrated by FIGS. 6A to 6E, at step 807. Alternatively, material is produced and dispensed in the second mode of operation illustrated by FIGS. 7A to 7F, at step 808.

Following steps 807 or 808 a question is asked at step 809 as to whether another dispensing operation is to be performed, and if so then the process returns to step 801 directly. If another operation is not due to be performed then the apparatus is put into a stand-by mode at step 810 before step 801 is re-entered. Depending upon inputs received at step 802 the apparatus may then perform further dispensing operations or be shut down.

FIG. 9

Figure 9:
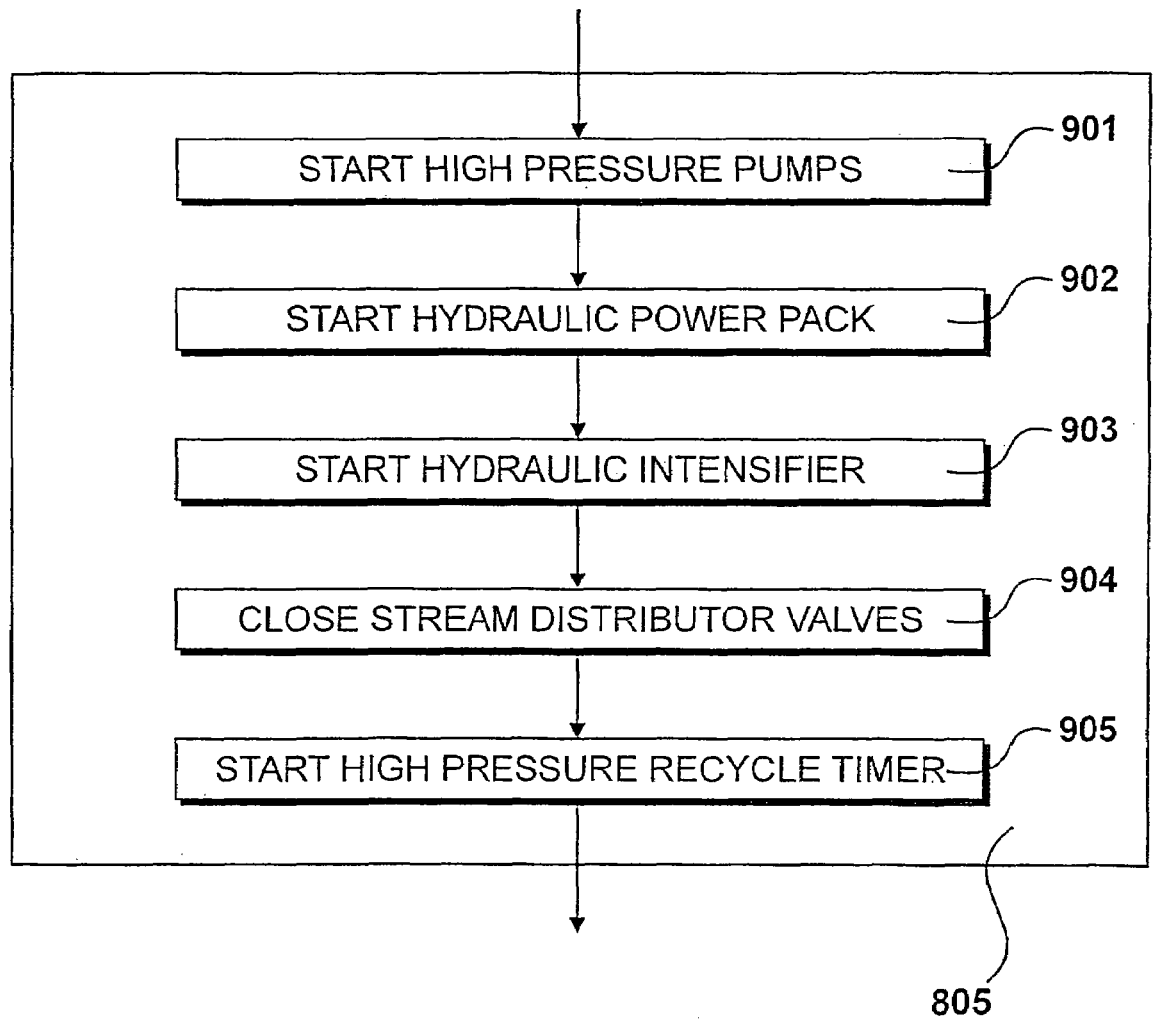
FIG. 9 shows the step 805 of initialising the apparatus.

The step 805 of initialising the apparatus is shown in detail in FIG. 9. Firstly at step 901 the pumps 103 are started, and at step 902 the hydraulic power pack is started in order to charge the first of two accumulators to a pressure of two hundred bar. At step 903 the hydraulic intensifier is started to store pressure of four hundred bar in the second accumulator.

At step 904 the stream distribution valves 502 and 552 are closed causing the circulating chemical reagents to be pumped at high pressure through the jets in the mixing head 104. In order to ensure good mixing of the reagents, a stable high pressure of typically one hundred and fifty bars must be established before production begins. For this reason a short period of time, of typically five seconds, is provided for the establishment of this pressure before production is allowed. To measure this period, a high pressure recycle timer is started at step 905.

FIG. 10

Figure 10:
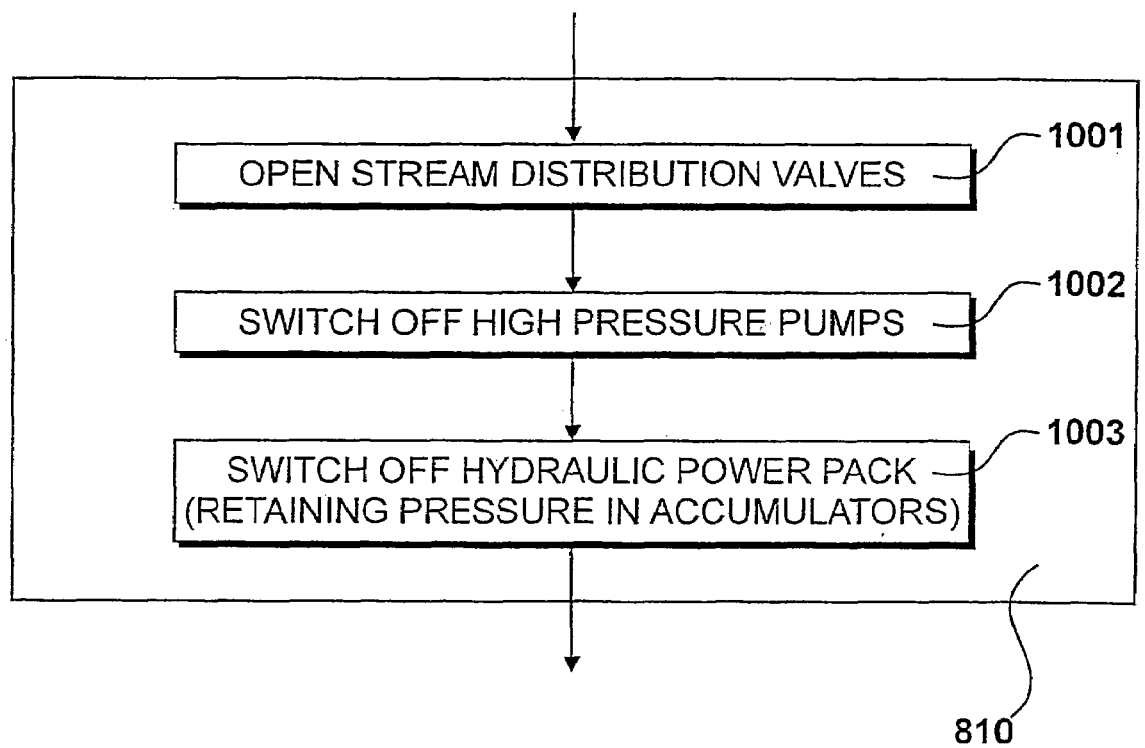
FIG. 10 shows the step 810 of putting the apparatus into stand-by mode.

The step 810 of putting the apparatus into stand-by mode is shown in FIG. 10. Firstly at step 1001 the stream distribution valves 502 and 552 are opened allowing the chemical reagents to circulate around the low pressure circuit instead of through the mixing head jets. The pumps 103 are then switched off at step 1002, and the hydraulic power pack is switched off at step 1003. The pressure stored in the accumulators is retained for later use.

FIG. 11

Figure 11:
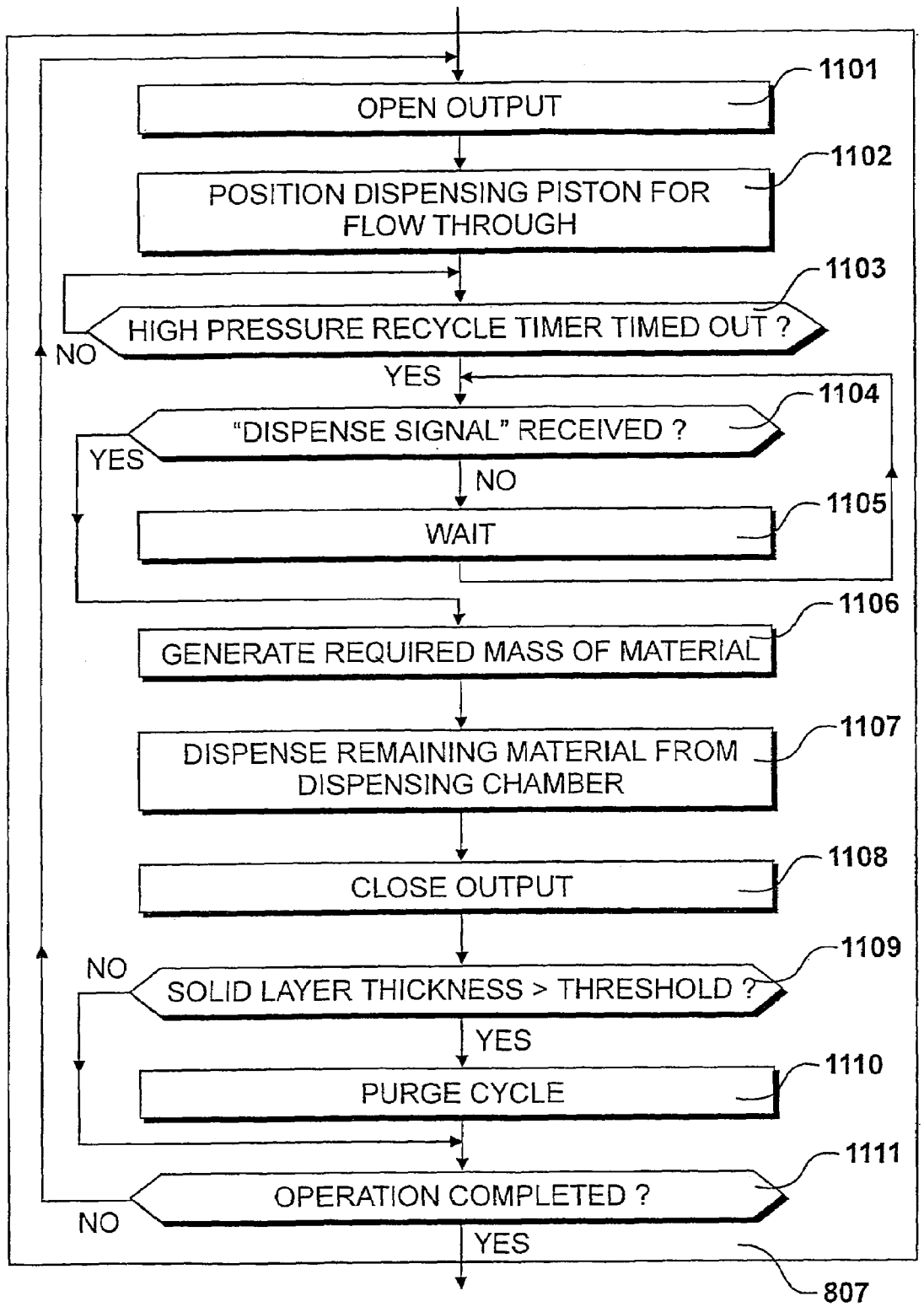
FIG. 11 shows the first mode of operation of the mixing head 104, represented by step 807, and illustrated by FIGS. 6A to 6E.

The first mode of operation of the mixing head 104, represented by step 807, and illustrated by FIG. 6A to 6E, is shown in greater detail in FIG. 11. Firstly, at step 1101, the output port is opened by retracting the output control rod 321. Specifically, the respective two-way hydraulic directional control valve is de-energised to move the output control rod back, and the retracted position is confirmed by proximity sensor 331. Then at step 1102 the dispensing piston is moved back under the control of the proportioning valve to a position which will allow material to flow from the production chamber 305 into the dispensing chamber 317, as shown in FIG. 6B.

At step 1103 it is determined whether or not the high pressure recycle timer, started at step 905, has timed out. When it has the process moves on to step 1104 where it is determined whether or not a signal has been received indicating that dispensing is required. This signal may be a user input by button 205 or a signal from an electromechanical manipulator. If the dispense signal has not yet been received, a wait state is entered at step 1105 before the question at step 1104 is asked again. Thus this wait loop continues until the dispense signal is received, at which time step 1106 is entered.

At step 1106 the required weight of material is produced and simultaneously dispensed. At step 1107 the material remaining in the dispensing chamber is also dispensed by bringing the dispensing piston 312 fully forward under proportioning valve control, using pressures of up to two hundred bar. The two-way hydraulic directional control valve for the output control rod 321 is then energised to close the output port 319. After confirmation of the closure is received from the proximity sensor 331, a question is asked at step 1109 as to whether the thickness of the solid layer of material 601 has become larger than a predetermined threshold value. If it has, then a purge cycle is performed at step 1110 before step 1111 is entered, but otherwise step 1111 is entered directly.

At step 1111 a question is asked as to whether the current operation has been completed. The current operation may comprise of several cycles of dispensing units of material, and so further dispensing cycles may still be required. If the current operation has been completed then step 807 is completed and step 809 is entered. Otherwise, steps 1101 to 1111 are repeatedly repeated until the question at step 1111 is answered yes.

FIG. 12

Figure 12:
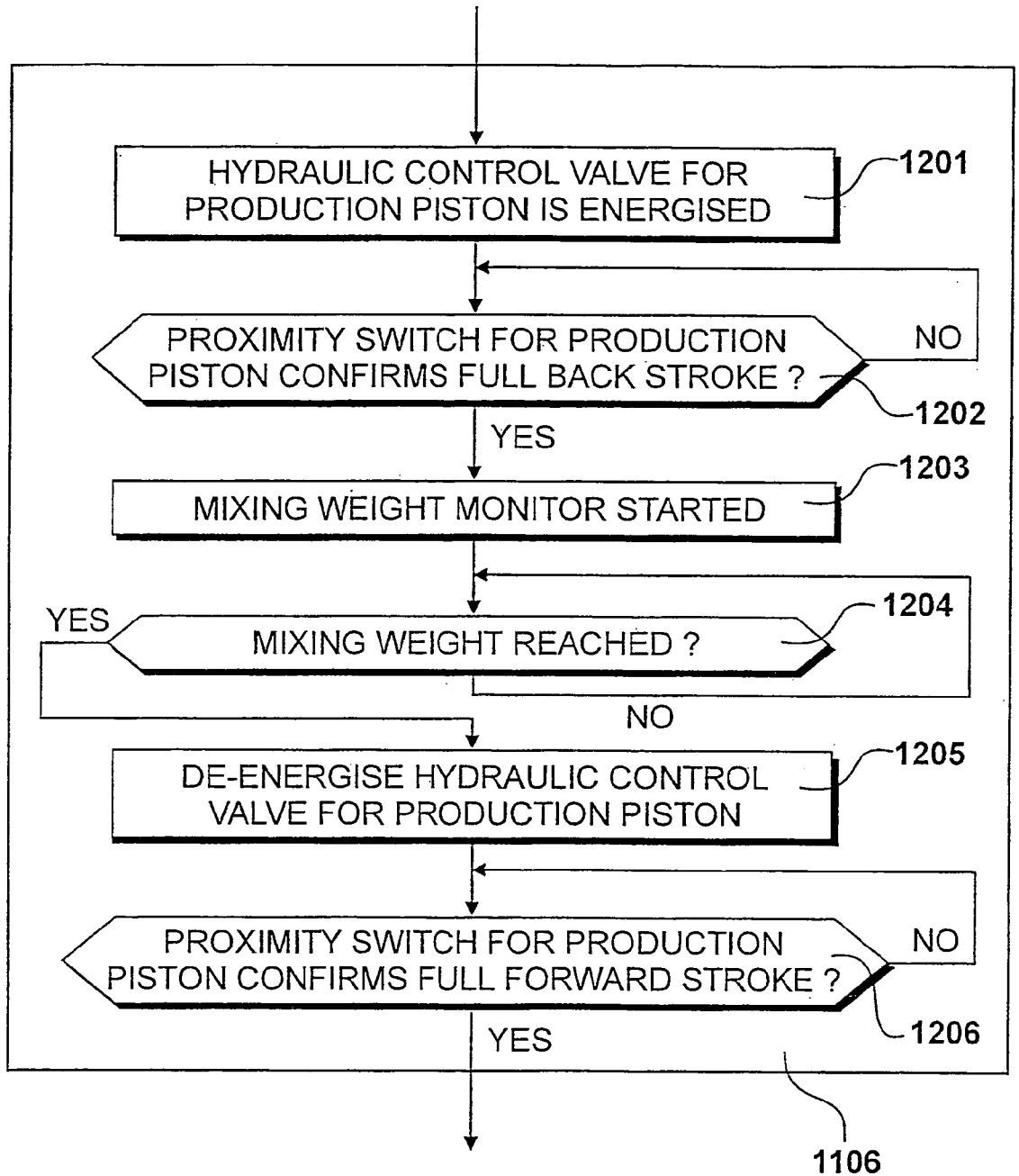
FIG. 12 shows the step 1106 of generating the required weight of material.

The step 1106 of generating the required weight of material is shown in further detail in FIG. 12. Initially at step 1201 the two-way hydraulic directional control valve for the production piston 301 is energised to move said piston backwards. Then a question is repeatedly asked at step 1202 as to whether the proximity switch 330 has confirmed full back stroke of the production piston. When this question is answered yes, a mixing weight timer is started at step 1203. A question is then asked at step 1204 as to whether the mixing has taken place for the required time to generate the required weight of material. If answered no, this question is repeated, and material is generated, until it is answered yes. When this question is answered yes, the hydraulic control valve for the production piston is de-energised at step 1205 to move said piston forward and stop production. When the proximity switch has confirmed that the production piston is fully forward, at step 1206, step 1106 is completed.

FIG. 13

Figure 13:
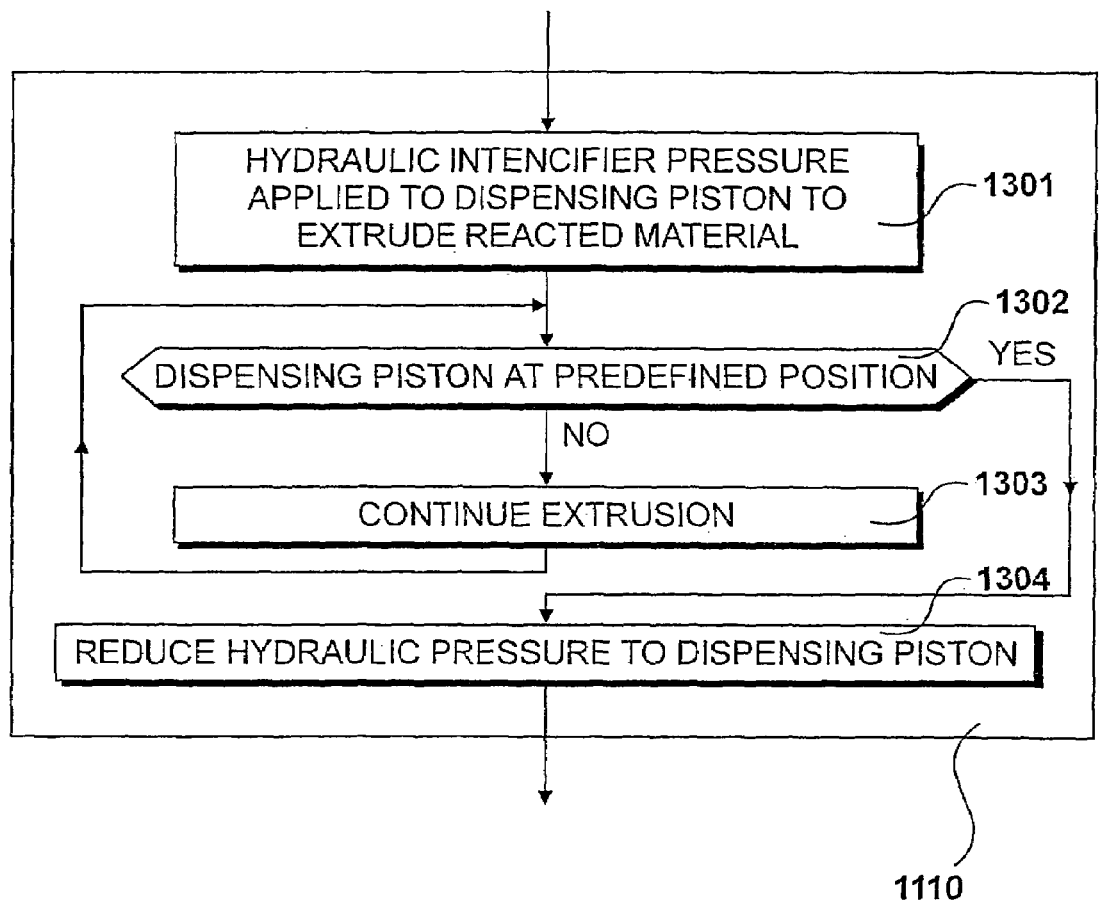
FIG. 13 shows the purge cycle represented by step 1110.

The purge cycle represented by step 1110 is shown in further detail in FIG. 13. At the start of the purge cycle, the mixing head is configured as shown in FIG. 6A. Thus, the pistons 301 and 312 and control rod 321 are all fully forward. However, the dispensing piston 312 is separated from the cap 318 by a layer of solid material 601 which has become thicker than desired. For this reason, the hydraulic intensifier pressure of 400 bar from the second accumulator is used to move the dispensing piston 312 under slow speed control, at step 1301. This has the effect of extruding the solid material layer through ducts 320. It is required that the solid layer be reduced to a thickness of typically 2 mm by this process, and therefore a question is asked at step 1302 as to whether the dispensing piston has reached a predefined position. If it has not, then extrusion continues at step 1303 before the question at step 1302 is asked again. Thus, material is extruded until the question at step 1302 is answered yes, whereupon the hydraulic pressure applied to the dispensing piston 312 is reduced at step 1304, and the purging cycle is completed.

The thickness of the solid layer remaining after the purging process is designed to prevent liquid/foam material escaping through the ducts 320 during normal production and dispensing operations. The thickness of material required for this purpose depends upon the mechanical properties of the particular material being processed, e.g. the particular polyurethane system. The post purging material thickness is therefore adjustable by the computer system 105 to allow for these variations. Similarly, the threshold value used at step 1109 to determine whether or not a purge cycle should be performed is also adjustable depending upon the mechanical properties of the material being process.

It should be understood that the solid layer of material 601 is used to seal the ducts 320, and the ducts 320 are used to maintain the layer's thickness within required bounds. If the mixing head 104 is new or if it has been thoroughly cleaned, such that the solid layer 601 is absent, it must first be established before normal operation of the mixing head can take place. To do this, a solid metal plate is attached to the front of the cap 318, and the output port 319 is closed while the dispensing piston is retracted. A very small quantity (typically fifty grams) of material is then produced, and the dispensing piston is lowered to compress the material into a solid (non-foam) layer which extends into the ducts 320. After the layer has had sufficient time to fully react and solidify, the mixing head is ready for normal production.

In an alternative embodiment a separate purging cycle, such as step 1110, is not required. Instead, each time material has been dispensed and the piston 312 has been brought down onto the solid material layer 601, the applied pressure is then increased so that said piston is always brought to the same position. i.e. each time after material has been dispensed, a very small quantity of solid material is extruded. In this way, a constant thickness of the solid material layer 601 on the inner surface of cap 318 is maintained.

FIG. 14

Figure 14:
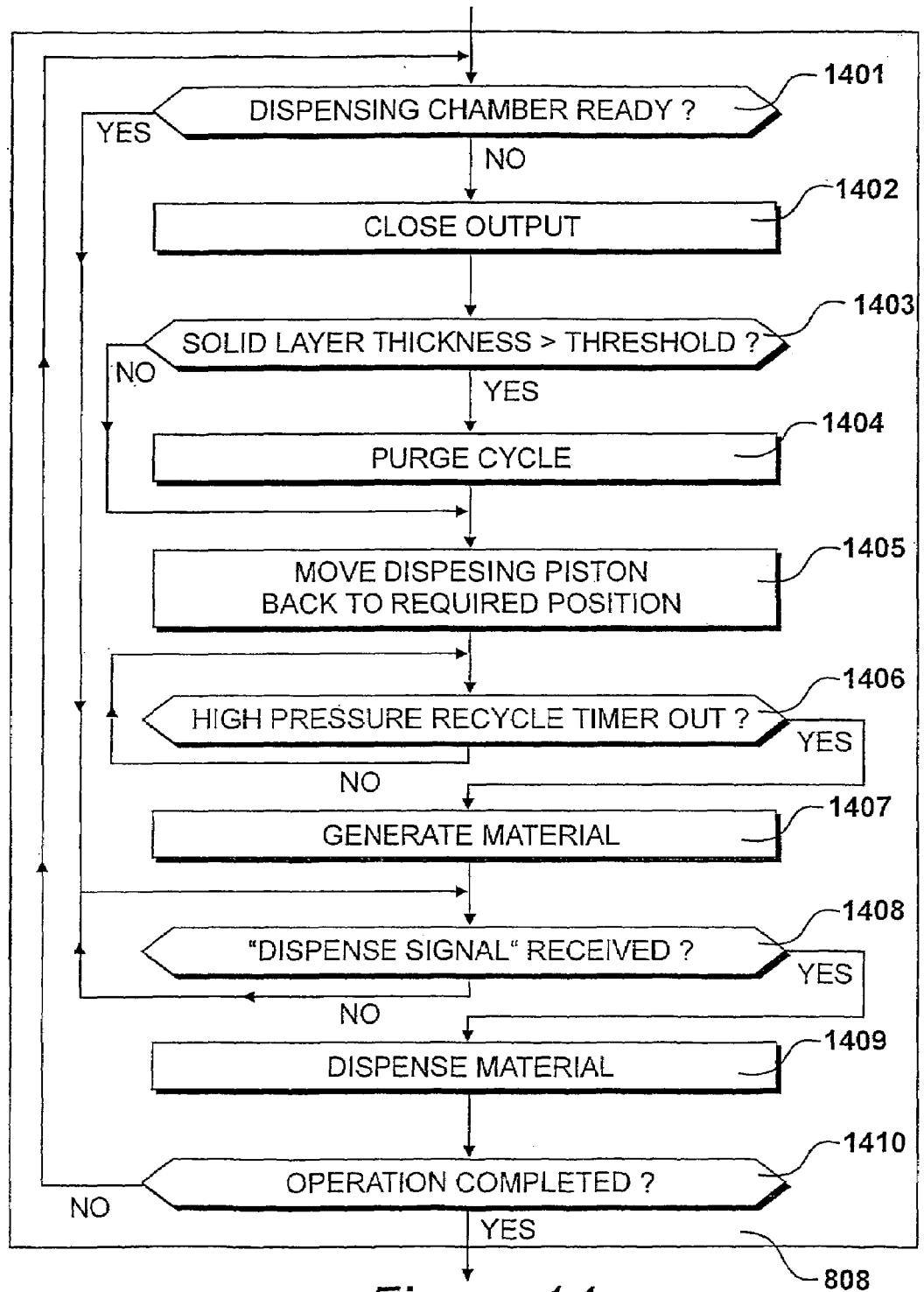
FIG. 14 shows the second mode of operation of the mixing head 104, represented by step 808, and illustrated by FIGS. 7A to 7F.

The second mode of operation of the mixing head 104, represented by step 808, and illustrated by FIG. 7A to 7F, is shown in greater detail in FIG. 14. Firstly, at step 1401, a question is asked as to whether the dispensing chamber is ready to dispense, i.e. does it contain material to be dispensed. On the first iteration of step 1401 this question will be answered negatively, but on subsequent iterations it may be answered in the affirmative. If the answer to this question is yes then step 1408 is entered directly, but otherwise the output port 319 is closed at step 1402. Specifically, the two-way hydraulic valve for the output control rod 321 is energised to close the port 319.

At step 1403 it is determined whether the solid layer of material 601 has a thickness which is greater than a threshold value, and if so then a purge cycle is performed at step 1404 before step 1405 is entered. (Steps 1403 and 1404 are essentially the same as steps 1109 and 1110). Otherwise, step 1405 is entered directly from step 1403. At step 1405 the dispensing piston is moved back, under proportioning valve control, to a required position. This required position has been calculated by the computer system 105 such that the volume of the dispensing chamber 317 is sufficiently large to receive the material which is to be produced.

At step 1406 it is determined whether the high pressure timer, which was started at step 905, has timed out. This step is repeated until the timer has timed out, and then dispensable material is generated at step 1407. Step 1407 is substantially the same as step 1106, but the generated material is stored in the dispensing chamber 317.

Following material production, a question is asked at step 1408 as to whether a signal has been received indicating that dispensing is required. When such a signal has not been received, step 1408 is repeated. When the dispense signal has been received, material is dispensed at step 1409. A question is then asked at step 1410 to determine if the current operation is completed. The operation may not be completed because a further production cycle and/or dispensing cycle is required. If the question at step 1410 is answered yes, step 808 is completed. Otherwise step 1401 is re-entered.

FIG. 15

Figure 15:
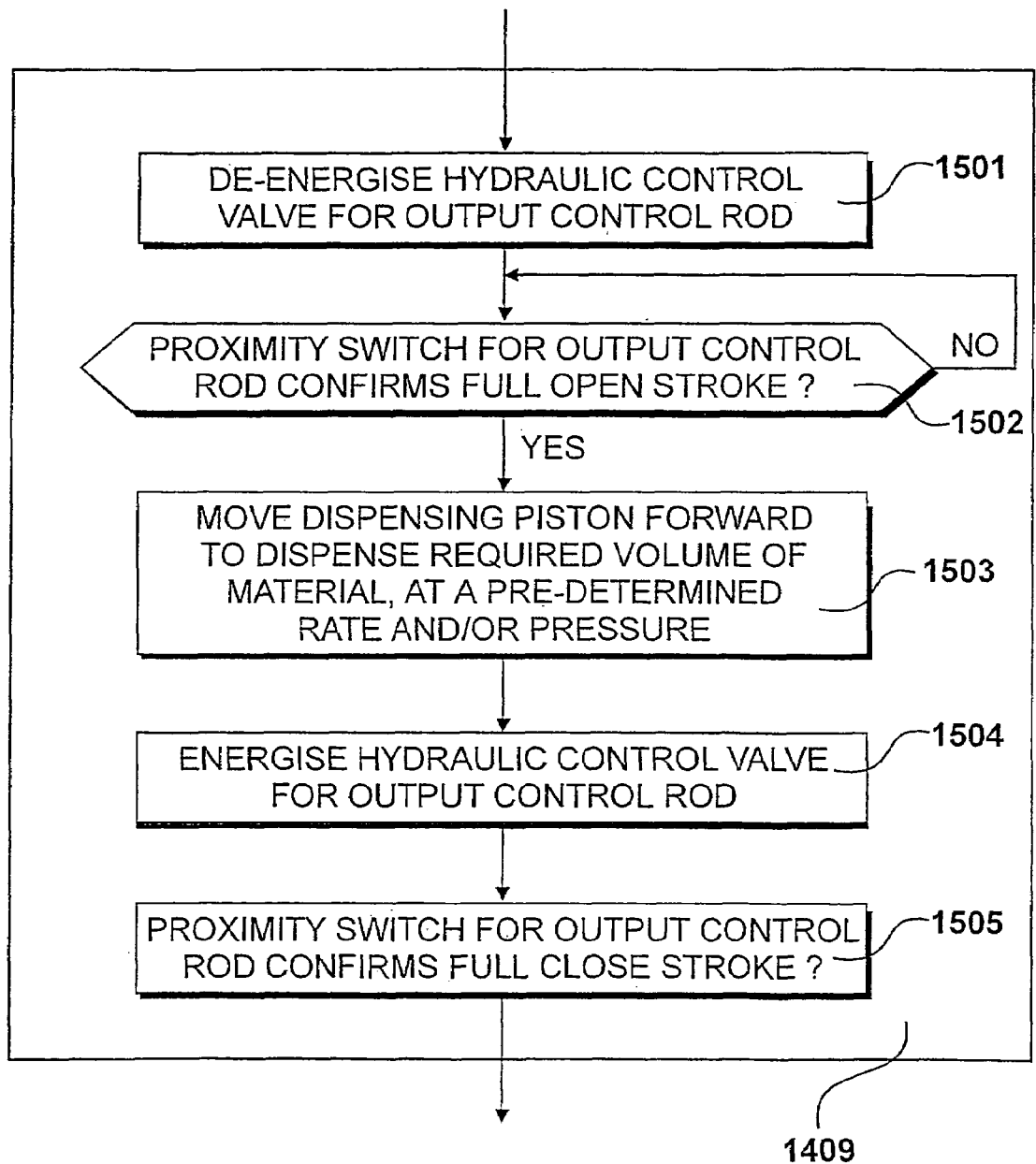
FIG. 15 shows the step 1409 of dispensing material.

The step 1409 of dispensing material is shown in detail in FIG. 15. Initially at step 1501 the two-way hydraulic directional control valve for the output control rod 321 is de-energised to open the output port 319. A signal received from the proximity switch 331 then confirms the movement of the output control rod at step 1502 before material is dispensed at step 1503. The dispensing is performed by moving forward the piston 312, at a controlled rate and/or pressure, and for a calculated distance, under the control of the proportioning valve. The distance is, of course, calculated by the computer system 105 such that the required volume of material is dispensed. The dispensed material may be the whole of the material produced at step 1407 or a fraction of it, with the remainder being dispensed during subsequent iterations of step 1409.

Upon completion of step 1503, the hydraulic control valve for the output control rod 321 is energised at step 1504, thus closing the output port 319 to prevent material remaining within chamber 317 from leaking out.

A signal received from the proximity switch confirms closure of the output port at step 1505 to complete step 1409.

In the majority of preferred applications, the production of material will tend to occur relatively quickly resulting in the dispensing chamber being filled relatively quickly. The material held temporarily within the mixing head will then be dispensed at a relatively slower rate thereby allowing the head to dispense polyurethane foam in environments where a relatively slow flow-rate is required. However, it is appreciated that all of the material contained within the dispensing chamber 317 must be removed while the material remains in a fluid state. Thus, in this way, high quality material may be produced, due to the high pressure mixing, but then dispensed at a relatively lower rate, thereby increasing the number of applications where high pressure mixed material may be deployed.

FIG. 16

Figure 16:
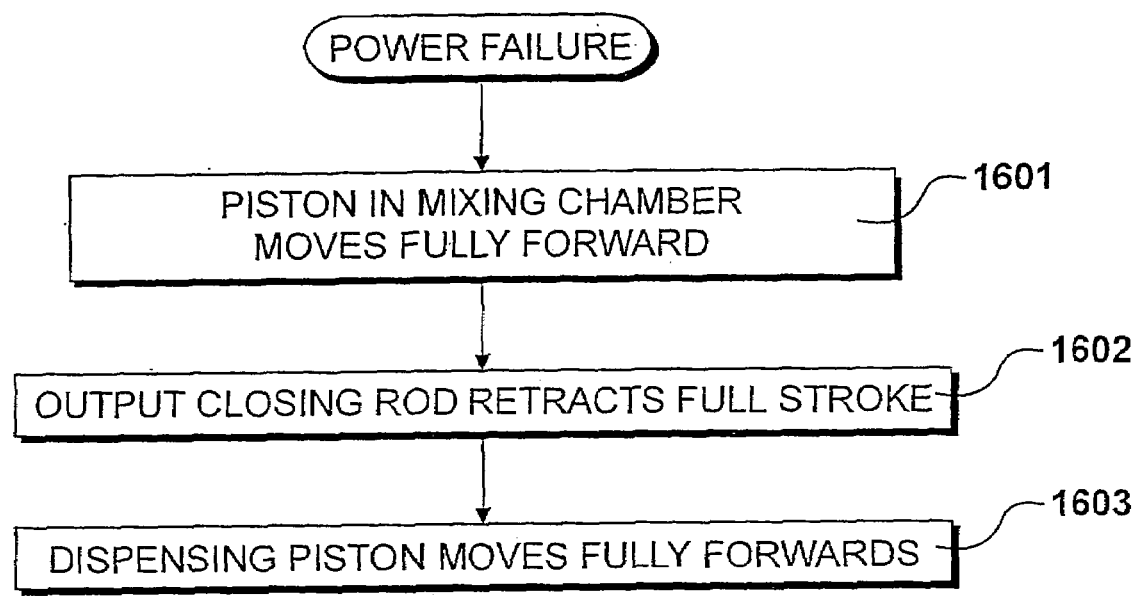
FIG. 16 illustrates automatic operation of the mixing head following power failure.

Automatic operation of the mixing head following power failure is illustrated in FIG. 16. Upon power failure, using the pressure stored in the accumulator of the power pack: the two-way hydraulic valve for the production piston 301 de-energises and consequently the piston moves forward to stop production (1601); the hydraulic valve for the output control rod de-energises and so said rod retracts to open the output port (1602); and the dispensing piston is similarly moved fully forward to dispense any material remaining in the mixing head (1603). By these means, the mixing head automatically stops production and expels the vast majority of material it contains. Consequently, upon resumption of power, production may be soon restarted.

FIG. 17

Figure 17A:
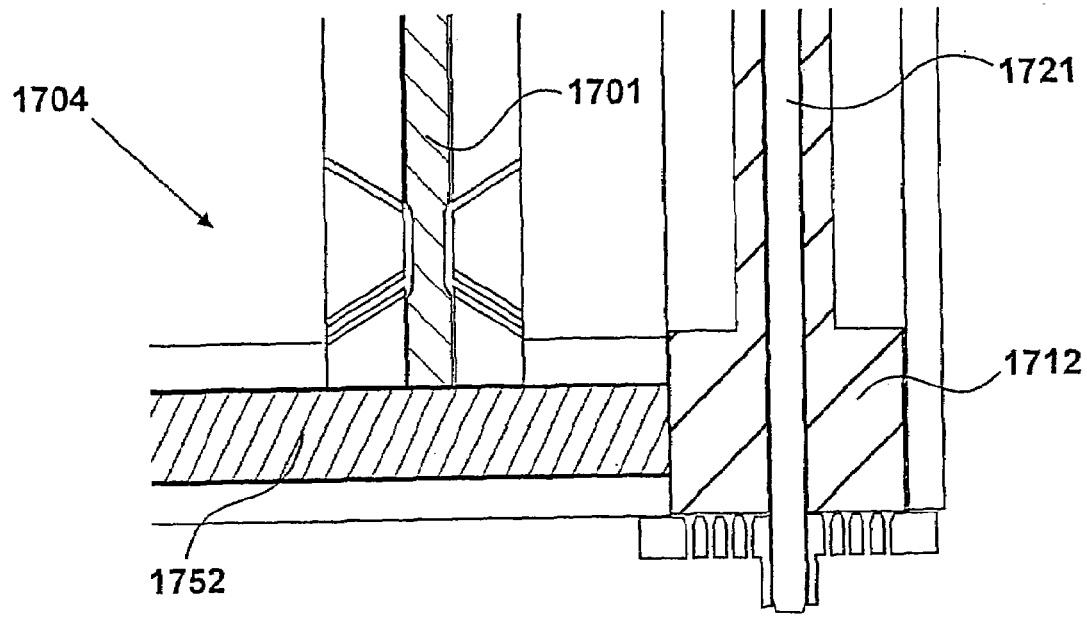
FIGS. 17A and 17B show, in cross section, an alternative mixing head 1704 embodying the present invention.
Figure 17B:
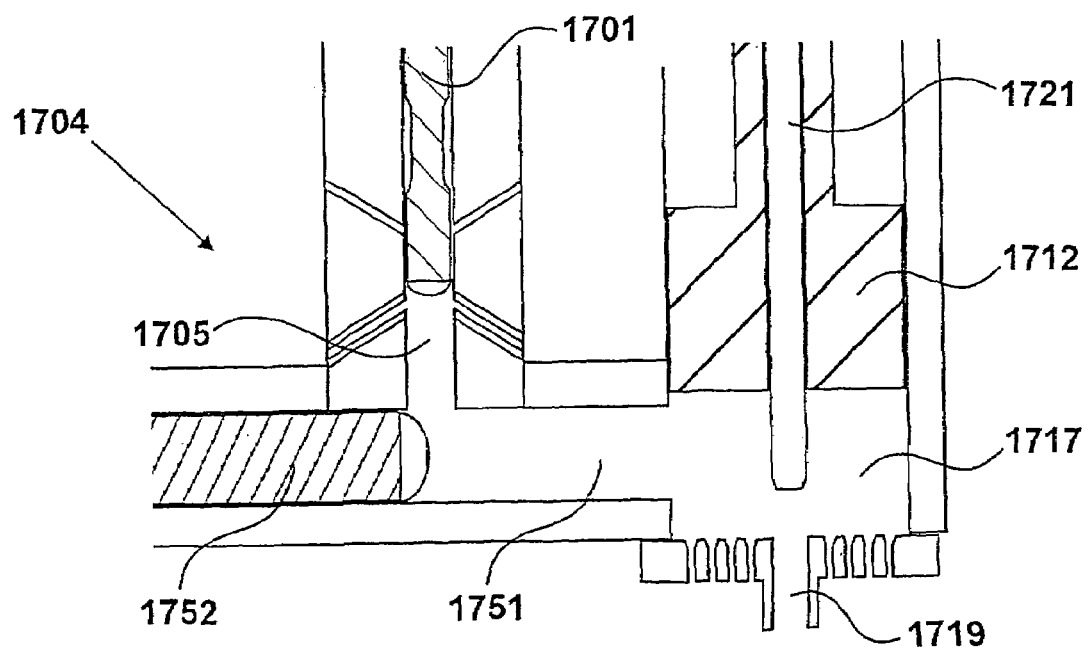

An alternative mixing head 1704 embodying the present invention is shown in cross section in FIGS. 17A and 17B. In FIG. 17A the mixing head is shown with its pistons forward and output port closed as it is between production cycles. FIG. 17B shows the same head with its pistons retracted and output open as it is when producing and dispensing material simultaneously. This corresponds to the first mode of operation illustrated for mixing head 104 in FIG. 6C.

Many components of the mixing head 1704 are in common with those of head 104 and so have been similarly labelled. Thus, the mixing head 1704 has a production piston 1701 which, when withdrawn, allows production of material within a production chamber 1705. Material is dispensed via, or temporarily stored within, a dispensing chamber 1717. Material stored within chamber 1717 may be dispensed by a dispensing piston 1712 through an output port 1719 which may be closed by lowering an output control rod 1721. In contrast to the main embodiment, the production chamber is connected to the dispensing chamber by a cylindrical passage 1751 which contains a piston 1752.

During production cycles, the piston 1752 is retracted immediately prior to production piston 1701, and then moved forward immediately after production piston 1701 has shut off production. Otherwise, the mixing head 1704 operates in a similar manner to mixing head 104. It should therefore be understood that the mixing head 1704 can operate in the two modes described with reference to mixing head 104.

Under very high material injection pressures, the piston 1752 provides an additional barrier between the material in dispensing chamber 1717 and the jets located within the production chamber 1705.

In conclusion, the preferred embodiments allow the rate at which material is mixed (to initiate chemical reaction) to be separated from the rate at which the output material is dispensed. Experimentation suggests that the material may be held within the dispensing chamber 317 for a maximum period of twenty seconds. The embodiments allow material to be dispensed at low rates (for example at three grams per second or lower) using equipment that does not need to be cleaned but would normally produce output material at a rate of fifty grams per second. Low dispensing rates usually require low pressure systems to be used which use organic solvents in a cleaning cycle usually taking a minimum of forty five seconds representing system downtime. Thus, the preferred embodiment removes the need for hazardous cleansing materials to be used while at the same time reducing downtimes. This benefits industries such as the previously described manufacture of engine filters where a typical facility may produce of the order of one thousand filters per hour.

The rate of dispensing in the preferred embodiment is fully detached from the rate of mixing therefore the output rate is very flexible. Thus, a single machine may offer many different output flow-rates by simple modifications to the dimensions of the output dispensing chamber.

A further advantage of the preferred embodiment is that the pressure at which the material is dispensed from the output port 319 is not related to the pressure encountered within the production chamber 301. Thus, under some circumstances the pressure at which the material is released through port 319 may be greater than the pressure encountered within the production chamber 301 during foam formation. The pressure encountered by the dispensing chamber 317 is not felt by pumps 103 when valves 502 and 552 are in their closed condition while material is being dispensed.

During operation, the volume of the output dispensing chamber is effectively variable given that the extent to which dispensing piston 312 is raised may be adjusted.

The provision of the output control rod 321 ensures that there is no leakage when material is not required.

The ability to adjust the rates at which material is dispensed provides an opportunity for the dispensed rate to be controlled and adjusted within a particular dispensing operation. Thus, for example, when producing a foam bead it would be possible for part of the bead to have a larger area by increasing the rate at which the material is released as an alternative to reducing the speed of a robotic movement. This greater flexibility may increase production speeds and may reduce mechanical constraints placed upon robotic operations.

In a standard high pressure system, a mixing head is required to open and close at each pouring of material. A start of mixing and an end of mixing create situations of poor impingement due to the deflecting effect created by the blind end section of the grooves in the production piston. Thus, situations often occur in which the start of a flow and the end of a flow are sub-standard and this may result in products being rejected. In the present preferred embodiment, material created at the start of material production and at the end of material production are mixed together within the output dispensing chamber such that material released from the output dispensing chamber 317 is substantially homogeneous. Furthermore the mixing is assisted by the mixture colliding with the output control rod 321.

Standard high pressure mixing heads perform a finite number of cycles before periodic maintenance is required. Typically, a mixing head will perform five thousand to five hundred thousand cycles depending upon the type of materials being processed. In some situations relatively short bursts of activity are required to produce relatively small volumes and this in turn will lead to a shorter active life. The present embodiment allows a number of activations within the production chamber to be reduced given that more material may be produced on each activation and then held temporarily within the output dispensing chamber.

The invention claimed is:

1. Apparatus for dispensing material produced by a chemical reaction between a first chemical reagent and a second chemical reagent, comprising:

injection means configured to produce a jet of said first chemical reagent and a jet of said second chemical reagent such that said jets collide to produce said material;

a storage chamber arranged to provide temporary storage space for the material, said storage chamber having an inlet for receiving said material, an outlet for dispensing the material and a dispensing piston configured to dispense said material from said storage chamber;

position sensing means configured to provide a measure of the position of said dispensing piston along said storage chamber; and a closing device moveable between a first position in which the material is prevented from passing through said outlet while allowing material to be received into the storage chamber through the inlet and a second position in which the material is allowed to be dispensed through said outlet.

2. Apparatus according to claim 1, wherein said apparatus has control means configured to control a rate at which said dispensing piston dispenses said material.

3. Apparatus according to claim 1, wherein said apparatus has control means configured to control a movement of said dispensing piston such that defined portions of the material are dispensed.

4. Apparatus according to claim 1, wherein said dispensing piston for dispensing said material has: a first surface acted upon by hydraulic fluid; and a second surface acting upon said material which is smaller than said first surface, whereby pressure applied to said material is larger than hydraulic pressure applied to said piston.

5. Apparatus according to claim 4, wherein said second surface is less than half of an area of the first surface.

6. Apparatus according to claim 1, wherein said storage chamber has a wall defining a plurality of orifices and said dispensing piston is configured to extrude built-up reacted material through said orifices.

7. Apparatus according to claim 6, wherein said orifices are configured to be blocked by a layer of solidified material while the material is dispensed through said outlet.

8. Apparatus according to claim 7, wherein a portion of said layer is regularly extruded during dispensing operations.

9. Apparatus according to claim 6, wherein said orifices are defined in a wall having a plurality of raised edges to assist extrusion through said orifices.

10. Apparatus according to claim 6, wherein said orifices are defined in a wall having a cooling means for cooling material within said chamber.

11. Apparatus according to claim 1, wherein said closing device is a rod having an end which is moveable into said outlet to provide said first position and which is retractable into said storage chamber to provide said second position.

12. Apparatus according to claim 1, wherein said material is produced intermittently at a first rate, and said material is dispensed at a second different rate.

13. Apparatus according to claim 12, wherein said first rate is higher than the second rate.

14. Apparatus according to claim 1, wherein said dispensed material is polyurethane produced by reacting a diol as the first chemical reagent with a diisocyanate as the second chemical reagent.

15. Apparatus according to claim 1, wherein said apparatus is configured to locate said closing device in said first position during material production, and subsequently locate said closing device in said second position during dispensing.

16. Apparatus according to claim 1, wherein said apparatus has:

a first mode of operation in which the apparatus is configured to locate said closing device in said first position during material production, and subsequently locate said closing device in said second position during dispensing; and a second mode of operation in which said apparatus is configured to locate said closing device in said second position during production of said material, such that material is dispensed during production.

17. Apparatus according to claim 1, including input interface means for receiving command instructions from a programmable control system.

18. Apparatus according to claim 1, wherein said injection means are arranged such that said jets collide in a production chamber having a piston for controlling said reaction, and said material is received at said storage chamber from said production chamber via a passage which is closeable by a third piston.

19. A method according to claim 1, wherein said storage chamber has a wall defining a plurality of orifices and said piston is used to extrude built-up reacted material through said orifices.

20. A method according to claim 19, wherein said orifices are blocked by a layer of solidified material while the material in a fluid state is dispensed through said outlet.

21. A method according to claim 20, wherein a portion of said layer is regularly extruded during dispensing operations.

22. A method of dispensing material produced by a chemical reaction between a first chemical reagent and a second chemical reagent, said method comprising the steps of:

injecting a jet of said first chemical reagent and a jet of said second chemical reagent such that said jets collide to produce said material;

temporarily storing the material in a chamber having an inlet for receiving said material, and an outlet for dispensing the material;

moving a closing device between a first position in which the material is prevented from passing through said outlet and a second position in which the material is allowed to be dispensed through said outlet;

moving a dispensing piston within said storage chamber to dispense the material from said storage chamber through said outlet; and sensing a position of the dispensing piston to provide a measure of the position of the piston along the storage chamber.

23. A method according to claim 22, wherein a rate at which said piston dispenses said material is controlled.

24. A method according to claim 22, wherein movement of said piston is controlled such that defined portions of the material are dispensed.

25. A method according to claim 22, wherein said piston for dispensing said material has a first surface acted upon by hydraulic fluid, and a second surface acting upon said material which is smaller than said first surface, whereby pressure is applied to said material which is larger than hydraulic pressure applied to said piston.

26. A method according to claim 25, wherein said second surface is less than half of an area of the first surface.

27. A method according to claim 22, wherein said material is produced at a first rate, and said material is dispensed at a second different rate.

28. A method according to claim 27, wherein said first rate is higher than the second rate.

29. A method according to claim 22, wherein said dispensed material is polyurethane produced by reacting a diol as the first chemical reagent with a diisocyanate as the second chemical reagent.

30. A method according to claim 22, wherein said closing device is located in said first position during material production, and said closing device is located in said second position during dispensing.

31. A method according to claim 22, wherein material is dispensed:
- in a first mode of operation by locating said closing device in said first position during material production, and subsequently locating said closing device in said second position during dispensing; and
- in a second mode of operation by locating said closing device in said second position during production of said the material, such that material is dispensed during production.

32. A method according to claim 22, in which command instructions are received at an input interface of a programmable control system.

33. Apparatus for dispensing material produced by a chemical reaction between a first chemical reagent and a second chemical reagent, comprising:
- injection means configured to produce a jet of said first chemical reagent and a jet of said second chemical reagent such that said jets collide to produce said material;
- a storage chamber arranged to provide temporary storage space for the material, said storage chamber having an inlet for receiving said material, an outlet for dispensing the material and a dispensing piston configured to dispense said material from said storage chamber;
- a closing device moveable between a first position in which the material is prevented from passing through said outlet while allowing the material to be received into the storage chamber through the inlet and a second position in which the material is allowed to be dispensed through said outlet;
- wherein said closing device is a rod having an end which is moveable into said outlet of said storage chamber to provide said first position and which is retractable into said storage chamber to provide said second position.

34. Apparatus according to claim 33, wherein said dispensing piston defines a bore, and said rod extends through said bore such that the rod is moveable with respect to said dispensing piston.

35. Apparatus according to claim 34, wherein said apparatus comprises position sensing means configured to provide a measure of the position of said dispensing piston along said storage chamber.

* * * * *